(12) United States Patent
Neskovic et al.

(10) Patent No.: US 9,483,679 B2
(45) Date of Patent: Nov. 1, 2016

(54) FINGERPRINT ENROLMENT ALGORITHM

(71) Applicant: ZWIPE AS, Oslo (NO)

(72) Inventors: Milan Neskovic, Sremska Mitrovica (RS); Marko Nikolic, Beograd (RS)

(73) Assignee: Zwipe AS, Oslo (NO)

( * ) Notice: Subject to any disclaimer, the term of this patent is extended or adjusted under 35 U.S.C. 154(b) by 0 days.

(21) Appl. No.: 14/439,681

(22) PCT Filed: Nov. 1, 2013

(86) PCT No.: PCT/EP2013/072874
§ 371 (c)(1),
(2) Date: Apr. 30, 2015

(87) PCT Pub. No.: WO2014/068090
PCT Pub. Date: May 8, 2014

(65) Prior Publication Data
US 2015/0294131 A1    Oct. 15, 2015

(30) Foreign Application Priority Data

Nov. 2, 2012   (GB) .................................. 1219750.5

(51) Int. Cl.
*G06K 9/00*         (2006.01)
*G06T 7/00*         (2006.01)

(52) U.S. Cl.
CPC ....... *G06K 9/00026* (2013.01); *G06K 9/00093* (2013.01); *G06T 7/003* (2013.01);
(Continued)

(58) Field of Classification Search
None
See application file for complete search history.

(56) References Cited

U.S. PATENT DOCUMENTS

| 4,752,966 A | 6/1988 | Schiller |
| 6,546,122 B1 | 4/2003 | Russo |

(Continued)

FOREIGN PATENT DOCUMENTS

| EP | 0050842 A2 | 5/1982 |
| EP | 2141633 A2 | 1/2010 |

(Continued)

OTHER PUBLICATIONS

Dandekar, Kiran, Balasundar I. Raju, and Mandayam A. Srinivasan. "3-D finite-element models of human and monkey fingertips to investigate the mechanics of tactile sense." Journal of biomechanical engineering 125.5 (2003): 682-691.*

(Continued)

*Primary Examiner* — Manav Seth
*Assistant Examiner* — David Perlman
(74) *Attorney, Agent, or Firm* — Sutherland Asbill & Brennan LLP

(57)    ABSTRACT

A method of enrolling a fingerprint using a narrow-width fingerprint scanner is described. The method may include the steps of receiving first, second, and third fingerprint image strips, respectively representing overlapping portion of the fingerprint, extracting minutiae from each of the fingerprint image strips, matching the extracted minutiae to determine relative positions of the fingerprint image strips, combining the extracted minutiae based on their relative positions to produce a combined set of minutiae representing a larger portion of the fingerprint, and determining that the fingerprint has been successfully enrolled if a width of the larger portion is greater than a predetermined minimum width, or, if not, requesting further fingerprint image strips until the width of the larger portion of the fingerprint is greater than the predetermined minimum width.

16 Claims, 12 Drawing Sheets

(52) U.S. Cl.
CPC ........ *G06T 7/0085* (2013.01); *G06T 2200/32* (2013.01); *G06T 2207/20021* (2013.01); *G06T 2207/20221* (2013.01)

(56) References Cited

U.S. PATENT DOCUMENTS

| | | | |
|---|---|---|---|
| 6,597,802 | B1 | 7/2003 | Bolle et al. |
| 6,681,034 | B1 | 1/2004 | Russo |
| 7,236,617 | B1 | 6/2007 | Yau et al. |
| 7,274,808 | B2 | 9/2007 | Baharav et al. |
| 7,574,022 | B2 * | 8/2009 | Russo ................ G06K 9/00026 382/124 |
| 2003/0123714 | A1 | 7/2003 | O'Gorman et al. |
| 2003/0126448 | A1 | 7/2003 | Russo |
| 2004/0208348 | A1 | 10/2004 | Baharav et al. |
| 2005/0157913 | A1 | 7/2005 | Yau et al. |
| 2005/0226479 | A1 | 10/2005 | Takahashi |
| 2008/0260209 | A1 * | 10/2008 | Yabushita .......... G06K 9/00026 382/107 |
| 2008/0273770 | A1 | 11/2008 | Kohout |
| 2009/0153297 | A1 * | 6/2009 | Gardner ............. G06K 9/00026 340/5.83 |
| 2010/0002914 | A1 | 1/2010 | Abiko |
| 2010/0002915 | A1 | 1/2010 | Govan |
| 2010/0111378 | A1 * | 5/2010 | Kwan ..................... G06K 9/03 382/124 |
| 2010/0127366 | A1 * | 5/2010 | Bond ................. G06K 9/00026 257/676 |
| 2010/0202671 | A1 | 8/2010 | Chen et al. |
| 2010/0232659 | A1 | 9/2010 | Rahmes et al. |
| 2012/0076370 | A1 * | 3/2012 | Lei ..................... G06K 9/00026 382/125 |
| 2013/0004032 | A1 * | 1/2013 | Abiko ................ G06K 9/00087 382/124 |

FOREIGN PATENT DOCUMENTS

| | | |
|---|---|---|
| WO | 01/80167 A1 | 10/2001 |
| WO | 2004/074978 A2 | 9/2004 |
| WO | 2008/135521 A2 | 11/2008 |

OTHER PUBLICATIONS

Tamer Uz, et al.; Title "Minutiae-Based Template Synthesis and Matching Using Hierarchical Delaunay Triangulations", dated 2007 IEEE, pp. 1-8.

Binandhan Chandrasekaran, et al; Title "Fingerprint Matching Algorithm Based on Tree Comparison Using Ratios of Relational Distances", Department of Computer Science, Univ. of Texas at Dallas, pp. 1-8., dated 2011.

Nalini K. Ratha, et al.; Title: "Robust Fingerprint Authetication Using Local Structural Similarity" dated 2000 IEEE, pp. 29-34, XP009125557.

Kai Cao, et al.; Title: "Fingerprint Matching by Incorporating Minutiae Discriminability", dated 2011 IEEE, pp. 1-6.

* cited by examiner

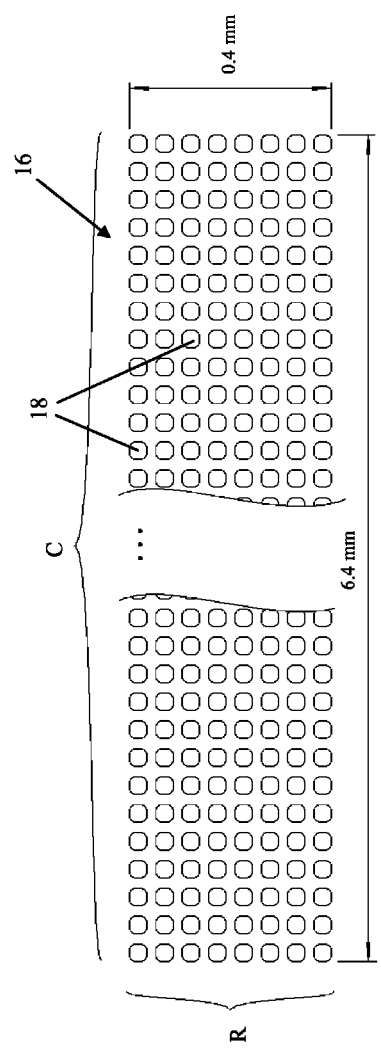

FINGERPRINT ENROLMENT ALGORITHM

RELATED APPLICATIONS

The present application is related to International Application No. PCT/EP2013/072873, entitled "Fingerprint Matching Algorithm," the national phase of which is filed herewith. International Application No. PCT/EP2013/072873 is incorporated herein by reference in full.

TECHNICAL FIELD

The present invention relates to minutia-based fingerprint analysis. More particularly, the present invention relates to a method of enrolling a template of a fingerprint image.

BACKGROUND OF THE INVENTION

A fingerprint is made up of interleaved ridges and valleys on the surface of a finger. A typical ridge varies in width from about 100 μm to 300 μm and a typical peak-to-peak ridge spacing is about 500 μm. A fingerprint image is a representation of those ridges and valleys, with ridge lines being typically represented as dark lines and the valleys between them as bright lines. An exemplary fingerprint image is shown in FIG. 1.

Fingerprints are unique to an individual, making them ideal for identification purposes. A fingerprint verification system can therefore verify a user's identity by comparing a captured fingerprint image with a pre-stored template fingerprint image. Although each fingerprint is unique to an individual, fingerprints share common features. These may be categorised as follows.

Level 1 features of a fingerprint include loops, whorls, arches and deltas formed by the ridges. These features describe the overall shape followed by the ridges. Level 1 features may be used to distinguish between two non-matching fingerprints, but do not give sufficient detail to confirm a match between two fingerprints.

Level 2 features of a fingerprint, or minutiae, are irregularities or discontinuities in the ridges. Eighteen different types of minutiae have been identified. However, the two major types of minutiae are ridge terminations and ridge bifurcations, i.e. where a ridge ends or where a ridge divides into two ridges. By comparison of Level 2 features, a match between two fingerprints can be confirmed.

Level 3 features of a fingerprint describe intra-ridge details. These include sweat pores and local ridge shape, as well as scarring, warts, creases and other local deformation of the ridges. The extraction of Level 3 features requires high resolution fingerprint sensors (typically greater than 800 dpi).

The following disclosure relates to fingerprint verification based on the analysis of Level 2 features.

Fingerprint verification is the one-to-one comparison of an input fingerprint with a reference fingerprint image for the purpose of either accepting or rejecting a claim of identity. It is common in the art to store, and thus compare, only a fingerprint template rather than the full fingerprint image. A fingerprint template is a set of key features extracted from the fingerprint image, such as minutiae points, that describe the fingerprint image.

The extraction of minutiae from a fingerprint image to form the template typically requires a gray-scale fingerprint image to be enhanced and then converted into a binary image. Fingerprint enhancement typically includes Gabor filtering, which improves discrimination between the ridges and valleys. The fingerprint image is binarised by setting a global threshold t and setting all pixels with intensity greater than t to 1 and all remaining pixels to 0 to produce a binary fingerprint image, and the binary fingerprint image is then thinned such that all ridges are reduced to one pixel width (see for example Zhang T. Y. and Suen C. Y. "A Fast Parallel Algorithm for Thinning Digital Patterns", Communications of the ACM, v. 27 n. 3, pp. 236-239, 1984) to produce a thinned ridge map, also know as a fingerprint skeleton.

Minutia detection is a trivial task when an ideal thinned ridge map is obtained. This can be seen from FIG. 2, which shows a thinned ridge map of the fingerprint image of FIG. 1 in which the minutiae points for ridge endings and ridge bifurcations are highlighted. The squares represent ridge endings and the circles represent ridge bifurcations.

FIG. 3 shows a minutiae representation of the fingerprint in FIG. 1. Each minutia is typically stored as a data point defined by a position within the fingerprint, a minutia type (i.e. ridge ending, ridge bifurcation, etc.) and a minutia angle (i.e. the orientation of the minutia relative to a reference orientation).

Fingerprint verification may be seen to comprise two distinct stages, enrolment and matching. Enrolment is the process of registering a new reference fingerprint image template and broadly comprises scanning a fingerprint and extracting a fingerprint template from that scan, and matching is the process of comparing a further input fingerprint with that fingerprint template, usually at a later time, in order to verify the identity of a user.

In known enrolment methods, a fingerprint image is input by being scanned by a fingerprint sensor. After the fingerprint image is obtained, feature extraction is performed, for example minutiae extraction as discussed above. Feature extraction provides a template that completely describes the fingerprint.

U.S. Pat. No. 4,752,966 describes a prior art method of enrolling a fingerprint using a swipe-type fingerprint sensor.

Matching of a fingerprint involves taking an input fingerprint image and comparing the input fingerprint image to one or more reference fingerprint images. The print is verified when a match is made between the input fingerprint image and a reference fingerprint image that has a sufficient reliability that the probability of a false positive is below some predetermined threshold.

US 2008/0273770 describes a prior art method of matching a proffered fingerprint image with a reference fingerprint image using minutia comparison. In US 2008/0273770, for each minutia of the input fingerprint, a "minutia neighbourhood" is identified centred around a central minutia and defining a finite region around the central minutia including at least a second minutia. In each neighbourhood, a minutiae pair is defined for each pair of the central minutia with a neighbouring minutia. Each minutiae pair is described by several features including the spacing between the two minutiae in a pair, the difference of orientations of two minutiae and the angle between the orientation of the central minutia and a line connecting the two minutiae. From these minutiae pair features, a minutiae pair index is constructed. Minutiae pair indices of a reference fingerprint image are compared to those of the proffered fingerprint to determine whether the fingerprints match.

SUMMARY OF THE INVENTION

Viewed from a first aspect, the present invention provides a method of enrolling a fingerprint comprising: receiving a first fingerprint image strip, a second fingerprint image strip and a third fingerprint image strip, each fingerprint image strip representing a portion of the fingerprint and the second and third fingerprint image strips overlapping the first fingerprint image strip; extracting minutiae from each of the first, second and third fingerprint image strips; matching the extracted minutiae of the first, second and third print image strips to determine relative positions of the fingerprint image strips; combining the minutiae of the first, second and third fingerprint image strips based on their relative positions to produce a combined set of minutiae representing a larger portion of the fingerprint; and determining that the fingerprint has been successfully enrolled if a width of the larger portion of the fingerprint is greater than a predetermined minimum width.

The method of enrolling a fingerprint is not a method of combining sequentially scanned 'lines' from a swipe-type sensor during a single finger swipe. That is to say, the strips are not individual 'line' scans from a swipe-type sensor obtained during a single finger swipe where multiple lines are combined to form a strip. Instead the preferred method involves combining multiple strips, which are strips obtained during multiple finger swipes. Of course, these multiple strips may be obtained as the result of an earlier combination of multiple 'line' scans.

In accordance with the method of the first aspect of the invention, a fingerprint is enrolled using at least three fingerprint image strips, for example each strip may represent a swiped area of a finger scanned using a swipe-type fingerprint sensor, which are then matched and combined based on minutiae representations to produce a combined set of minutiae representing the fingerprint. The fingerprint is only deemed successfully enrolled if the enrolled portion of the fingerprint is greater than a predetermined width. It will be understood that more than three fingerprint image strips may be provided and that, of those fingerprint image strips, three overlapping fingerprint image strips are selected, matched and combined, or even that all of the fingerprint image strips provided may be matched and combined.

The method of the first aspect is particularly suitable for fingerprint enrolment where a narrow-width fingerprint sensor is used to enroll the fingerprint, i.e. one that has insufficient width to capture the entire width of the fingerprint. This may be the case for example where the fingerprint sensor is subject to power or space restraints. In an exemplary embodiment the method of the first aspect of the invention is executed in an electronic card that includes a narrow-width fingerprint sensor due to power constraints.

Where a narrow-width fingerprint sensor is used, which may have a width as low as 6 mm, only a relatively small portion of the fingerprint can be captured by a single scan. It is clearly not ideal for a reference template of the fingerprint to have this narrow a width because in a later fingerprint scan even a displacement of a few millimeters, an unperceivable deviation for a user, will cause a significant difference in the minutiae captured in the scan, which leads to reduced accuracy in fingerprint matching.

In previous techniques, to avoid this problem when a narrow-width fingerprint sensor is used, the reference template would be enrolled using a separate large-area fingerprint scanner. However, this is undesirable as the same fingerprint sensor cannot be used to both enroll the fingerprint and to later scan the fingerprint for matching. Such previous techniques therefore required either the purchase of a second fingerprint sensor or the use of one at some other location. The additional time and/or cost required to enroll new fingerprints has thus limited the desirability of fingerprint-based devices in small-scale applications, such as personal/home use or in small businesses. The method of the first aspect of the present invention has overcome this problem by sampling three adjacent fingerprint image strips, such as those from a narrow-width fingerprint sensor, and combining them to create a combined fingerprint template. Furthermore, by allowing the fingerprint to be enrolled without the need for an external fingerprint sensor, security of a user's biometric data can be enhanced because a closed system can be operated whereby the biometric data are never externally accessible. For example in an electronic card having an integral fingerprint sensor, the fingerprint may be enrolled by the fingerprint sensor, stored to a memory of the electronic card, and processed by a processor of the electronic card, without the biometric data ever being externally accessible.

Although minutiae-based methods of combining fingerprint templates are known in the art (see for example U.S. Pat. No. 6,546,122 B1), the method of the first aspect of the invention relates particularly to the combination of multiple fingerprint image strips in order to enroll at least a predetermined minimum width of a fingerprint.

In order to combine the fingerprint image strips, the portions of the fingerprint represented by the second and third fingerprint image strips must overlap the portion of the fingerprint represented by the first fingerprint image strip by an amount sufficient to enable matching. Preferably, the overlap is at least a quarter of a width of the fingerprint image strip (resulting in an enrolled fingerprint image width of 2.5 times the width of a fingerprint image strip). In some cases, three strips may be provided that do not overlap, for example if the user moves their finger too far between scanning of the strips. In such an event, further fingerprint image strips should be provided until three suitable overlapping fingerprint image strips are available.

Thus, receiving the first, second and third fingerprint image strips, wherein the portions of the second and third fingerprint image strips overlap the portion of the first fingerprint image strip, may comprise receiving an initial set of first, second and third fingerprint image strips; determining whether portions of the fingerprint represented by two of the initial set of fingerprint image strips overlap a portion of the fingerprint represented by another of the initial set of fingerprint image strips; and, if so, using the initial set of fingerprint image strips as the first, second and third fingerprint image strips; or else, receiving further fingerprint image portions until portions of the fingerprint represented by two of the fingerprint image strips overlap a portion of another fingerprint image strip; and using those fingerprint image strips as the first, second and third fingerprint image strips.

The method may comprise requesting input of further fingerprint image strips when the initial set of fingerprint image strips do not overlap sufficiently. Yet further fingerprint image strips may be requested until a set of at least three strips with the required overlap are received.

Although typically three fingerprint image strips will provide a good fingerprint template, it is sometimes the case that three fingerprint image strips are insufficient to meet the predetermined minimum width. This may be the case, for example, where the overlap between two of the strips is too large or where the predetermined minimum width is particularly wide. The method may therefore further comprise, if the width of the enrolled portion of the fingerprint is not greater than the predetermined minimum width, receiving subsequent fingerprint image strips until the width of the enrolled portion of the fingerprint is greater than the predetermined minimum width.

The method may also comprise alerting the user when additional fingerprint image strips are required to complete enrolment, for example, when the width of the enrolled portion of the fingerprint is not greater than the predetermined minimum width, or when three overlapping fingerprint image strips have not been provided.

The matching is based on the minutiae extracted from the fingerprint image strips. Any suitable method of matching may be used; however, a particularly computationally efficient method is to match the extracted minutiae using a local reference frame. As such, the matching is rotation and translation invariant with respect to the absolute positions and orientations of the fingerprint image strips and thus the fingerprint image strips may be matched without knowing their relative position and orientation.

Thus, the matching may comprise determining a first local neighbourhood for each extracted minutiae of one of the fingerprint image strips and for each extracted minutiae of another of the fingerprint image strips, wherein each first local neighbourhood includes at least one extracted minutia neighbouring the respective extracted minutia; comparing the first local neighbourhoods of the extracted minutiae of the one of the fingerprint image strips with the first local neighbourhoods of the extracted minutiae of the other of the fingerprint image strips to determine matched minutiae appearing in both the extracted minutiae of the one of the fingerprint image strips and the extracted minutiae of the other of the fingerprint image strips; and determining the relative position of fingerprint image strips based on the matched minutia.

Any suitable comparison algorithm may be utilised to determine matched minutia appearing in both the first and second sets of minutia, but preferably the comparison is rotation and translation invariant so as to improve computational efficiency. Thus, the comparing of the first local neighbourhoods may be based on a relative relationship in the form of at least one of: a relative position, a relative orientation and a relative minutia angle of each of the at least one neighbouring minutia relative to a central minutia of the respective first local neighbourhood.

The method preferably further comprises: for each first local neighbourhood, determining a relative relationship between a central minutia of the first local neighbourhood and each of the at least one neighbouring minutia, wherein comparing the first local neighbourhoods comprises comparing each relative relationship of the first local of the extracted minutiae of the one of the fingerprint image strips with each relative relationship of the first local neighbourhoods of the extracted minutiae of the other of the fingerprint image strips, and wherein a matched minutiae is determined as appearing in both the extracted minutiae of the one of the fingerprint image strips and the extracted minutiae of the other of the fingerprint image strips when a difference between each relative relationship of the respective first local neighbourhood of the minutiae of the extracted minutiae of the one of the fingerprint image strips and a corresponding relative relationship of the first local neighbourhood the extracted minutiae of the other of the fingerprint image strips is below a predetermined threshold.

The method may utilise just one of a relative position, a relative orientation and a relative minutia angle as the relative relationship. In preferred embodiments more than one or all of these parameters are used in the matching of minutiae.

In some cases, a further matching step may be performed based only on neighbouring minutiae that were matched in the previous step. This step is particularly useful because the overlapping portions of the fingerprint image strips are very narrow, and are therefore prone to missing minutiae, which mean that a large number of local neighbourhoods may not include the same neighbouring minutiae.

Thus, the method may further comprise determining a second local neighbourhood for each unmatched extracted minutiae of the one of the fingerprint image strips and in the other of the fingerprint image strips, wherein each extracted minutia that is not a matched minutia is an unmatched extracted minutia, and wherein each second local neighbourhood includes at least one matched minutia neighbouring the respective unmatched extracted minutia; and comparing the second local neighbourhoods of the unmatched extracted minutiae of the one of the fingerprint image strips with the second local neighbourhoods of the unmatched extracted minutiae of the other of the fingerprint image strips to determine further matched minutiae appearing in both the extracted minutiae of the one of the fingerprint image strips and the extracted minutiae of the other of the fingerprint image strips, wherein the relative position of fingerprint image strips is determined also based on the further matched minutia.

As discussed above, the invention is particularly applicable where the fingerprint image strips are significantly narrower than the fingerprint to be enrolled. Therefore each of the fingerprint image strips may have a width of less than 10 mm, and more preferably less than 7 mm. However, the width of each strip should ideally not be so narrow as to prevent sufficient minutiae being captured to enable the strips to be matched based on those minutiae. Thus, each fingerprint image strip preferably has a width of at least 2 mm, and more preferably at least 4 mm.

Preferably the predetermined minimum width for the enrolled portion is at least 12 mm, more preferably the predetermined minimum width is at least 15 mm. However, alternatively, the predetermined width may be defined with reference to a width of the fingerprint image strips. Thus, the predetermined minimum width may be greater than or equal to twice the width of the fingerprint image strips, and more preferably greater than or equal to 2.3 times the width of the fingerprint image strips (corresponding to an average overlap of 0.33 times the width of the fingerprint image strips).

These minimum widths are sufficient to capture minutiae from across the width of the fingerprint, thereby allowing for a good comparison to be made with a later scanned strip. In particular, these widths ensure that a small deviation of the scan area will not take the subsequently scanned strip outside of the enrolled area of the fingerprint.

Although the fingerprint image strips may represent strips of the fingerprint in any orientation, it is desirable that all of the fingerprints are substantially parallel with one another so as to maximise the coverage of the fingerprint without unnecessarily scanning the same region multiple times. Each of the fingerprint image strips has a width and a length, the width being narrower than the length. The lengths of each of the fingerprint image strips are preferably substantially parallel with one another (preferably within 20°, and more preferably within 10°).

More preferably the lengths of each of the fingerprint image strips is substantially aligned with a longitudinal direction of the finger (preferably within 20°, and more preferably within 10°). This is because, when a swipe sensor or the like is used, only the width of the fingerprint image strip is limited and therefore it is desirable to maximise the amount of the fingerprint captured by each strip. The strips can of course instead be oriented in any direction.

Preferably, the fingerprint image strips are input using a swipe sensor, or similar, although it will be understood that a strip-shaped area sensor could be used. Thus, preferably each of the first fingerprint image strip, the second fingerprint image strip and the third fingerprint image strip are obtained by scanning the fingerprint using a swipe-type fingerprint sensor or a strip-shaped area sensor. The method may comprise the step of obtaining the fingerprint image strips, which are hence received from the sensor.

Viewed from a second aspect, the present invention also provides a data processing apparatus for enrolment of a fingerprint, the data processing apparatus being arranged to: receive data representing a first fingerprint image strip, a second fingerprint image strip and a third fingerprint image strip, each fingerprint image strip representing a portion of the fingerprint and the second and third fingerprint image strips overlapping the first fingerprint image strip; extract minutiae from each of the first, second and third fingerprint image strips; match the extracted minutiae of the first, second and third fingerprint image strips to determine relative positions of the fingerprint image strips; combine the minutiae of the first, second and third fingerprint image strips based on their relative positions to produce a combined set of minutiae representing a larger portion of the fingerprint; and determine that the fingerprint has been successfully enrolled if a width of the larger portion of the fingerprint is greater than a predetermined minimum width.

As above, the enrolment of a fingerprint by this aspect is not the same as the combining of sequential 'line' scans from a swipe-type sensor during a single finger swipe. That is to say, the strips are not individual line scans from a swipe-type sensor obtained during a single finger swipe (although the strips may be the result of combining such line scans to produce a scan of the swiped portion of the finger). Instead the strips involve image data obtained by multiple swipes of the finger over a fingerprint sensor.

The data processing apparatus may comprise a memory and a processor, the memory storing instructions that when executed will cause the processor to perform the steps described above.

In preferred embodiments, the data processing apparatus may be arranged to carry out any or all of the preferred features discussed above in relation to the method of the first aspect.

The apparatus may comprise a fingerprint sensor for obtaining fingerprint data and communicating the fingerprint data to the processor. In a preferred aspect, the apparatus is an electronic card comprising a fingerprint sensor, the memory and the processor. Preferably, the fingerprint sensor has a width of less than 10 mm, and more preferably less than 7 mm. Each fingerprint image strip preferably has a width of at least 2 mm, and more preferably at least 4 mm.

Electronic cards used for the fingerprint verification typically have very strict power requirements as they are either powered by onboard batteries or draw power from a reader when used. This means that the components used on the electronic card, particularly the processor and the fingerprint sensor, must be low-power devices, which limits the processing power of the processor and the available size of the fingerprint sensor.

The method of the first aspect of the invention is particularly applicable to narrow-width fingerprint sensors, such as would be required where low power consumption is necessary, as the entire fingerprint cannot be enrolled in a single input. The method of the first aspect is an improvement compared to enrolling the fingerprint by some external means as it does not require any external hardware. Thus, the method of the first aspect is particularly beneficial when used in combination with an electronic card including a narrow-width fingerprint sensor.

Viewed from a third aspect, the present invention also provides a computer program product, or a tangible computer readable medium storing the computer program product, the computer program product comprising instructions that when executed will cause a processor to perform the method of the first aspect and optionally any or all of the preferred features discussed above.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWING

Certain preferred embodiments of the present invention will now be described in greater detail by way of example only and with reference to the following figures, in which:

FIG. 5 shows a pixel matrix of the fingerprint swipe sensor of FIG. 4;

DETAILED DESCRIPTION

The following preferred embodiments of the invention relate particularly to fingerprints. The term fingerprint is intended to mean a print (a graphic representation of ridges and valleys) of a finger (including the thumb). However, it will be understood that the method is not limited to fingerprints, but is applicable to any print that can be represented by a set of minutiae points. Such prints include, for example, prints from fingers, palms, toes and soles.

Figure 4A:
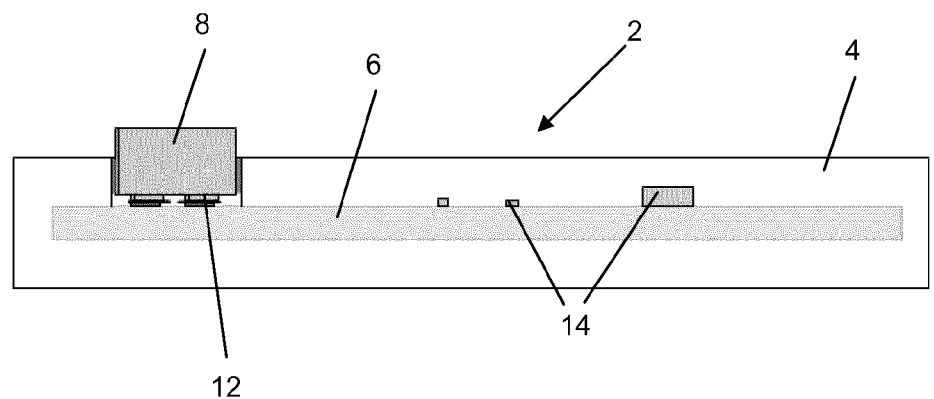
FIG. 4A shows a partially cut-away side view of an electronic card including a fingerprint swipe sensor.
Figure 4B:
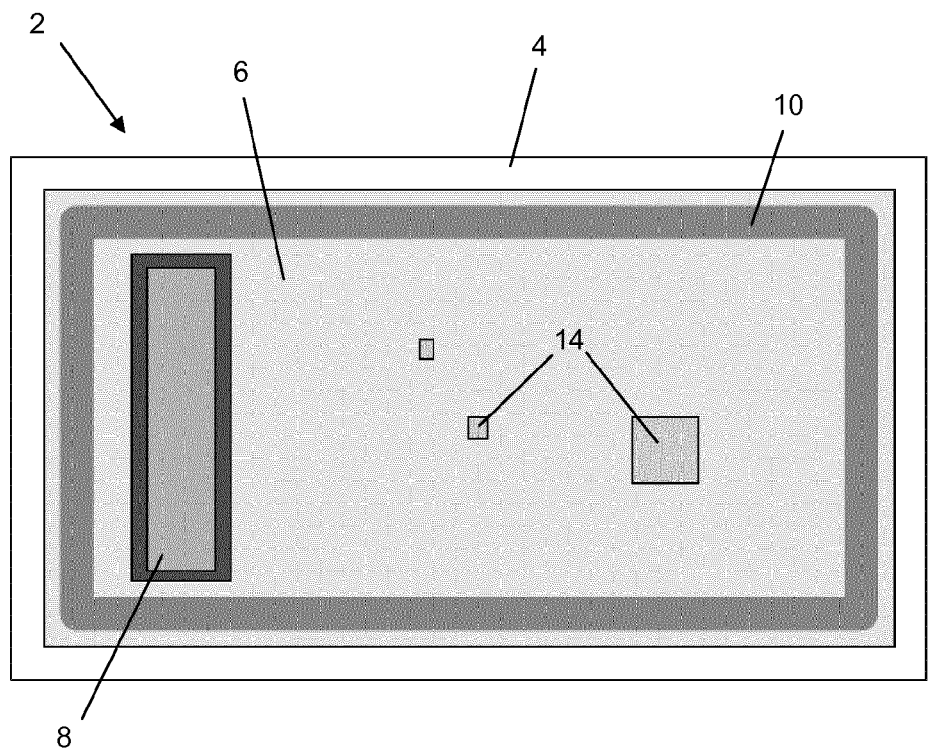
FIG. 4B shows a partially cut-away top view of an electronic card including a fingerprint swipe sensor.

FIGS. 4A and 4B show partially cut-away views of an electronic card 2 including a fingerprint swipe sensor 8. The following preferred embodiments will be described with reference to the electronic card 2. The fingerprint sensor 8 can be incorporated into any suitable smart card as a biometric sensor for additional security. The electronic card 2 shown in FIGS. 4A and 4B is not to scale and certain features have been emphasised. Particularly, the thicknesses of the card body 4 and of the circuit 6 have been enlarged so as to more clearly illustrate the features of the smart card. Also, the size of the fingerprint sensor 8 is not necessarily in scale with the size of the smart card 2.

Smart cards are generally of a similar size to a conventional credit card and have a similar look and feel. Conventional credit cards are manufactured in accordance with international standard ID-1 of ISO/IEC 7810, that is to say having dimensions of 3⅜ inches by 2⅛ inches (approx. 86 mm by 54 mm) and a thickness of 6 mil (approx. 0.75 mm). The smart card may be thicker than a conventional credit card in order to accommodate a circuit and fingerprint sensor.

In contact smart cards, often known as chip cards, metal contacts are brought to the surface of the card in a predetermined pattern to form a contact pad, which is accessible from the outside of the card. These contacts are connected to a microprocessor inside of the card. Smart cards of the first type are commonly used by being slid into a recess of a card reader such that spring loaded contacts in the card reader make contact with the contact pad on the card in order to read the contents of the microprocessor.

In contactless smart cards, often known as proximity cards, the contents of the microprocessor are transmitted to the reader using non-contact communication technology. One example of such is radio-frequency identification (RFID), where an antenna is formed within the body of the card and a radio-frequency electromagnetic field is generated by a reader to read the contents of the microprocessor. Encryption may be employed in smart cards of this type to ensure secure transmission of messages between the card and the reader.

The example smart card 2 of FIGS. 4A and 4B is a contactless smart card 2 that comprises a card body 4 and a circuit 6 enclosed within the card body. The circuit 6 is in the form of a printed circuit board, which is preferably made from poly amide or FR-4 grade glass-reinforced epoxy laminate. A fingerprint sensor 8 is attached to the circuit 6 via a hole formed in the card body 4. An example of a suitable fingerprint sensor is the FPC 1080A fingerprint sensor manufactured by Fingerprint Cards AB of Sweden. This is a capacitive swipe-type fingerprint sensor.

The circuit 6 is laminated between at least two layers of plastic. The layers of plastic would typically be made of PVC; however, other plastics may be used. Examples of other suitable plastics include polyester, acrylonitrile-butadiene-styrene (ABS), and any other suitable plastic. Additionally, plasticisers or dyes may be added to the plastic to achieve a desired look and feel.

An antenna 10 is connected to the circuit 6. The antenna 10 is used to communicate with a card reader, which is external to card 2. The antenna 10 may be formed by etching a suitable pattern onto a copper cladding of the printed circuit board. The antenna in this embodiment surrounds the whole circuit 6, but in other embodiments it may occupy a smaller area of the card. For example, an antenna surrounding approximately a third of the area of the card is sufficient for most purposes.

The fingerprint area sensor 8 is joined to the circuit 6 via contacts 12. The circuit 6 also includes a number of additional components 14. These can include a processor and a memory. The memory is arranged to store both software and information associated with the smart card 2. For example, this may include the identity of a bearer of the smart card 2, account information of the bearer of the smart card 2, and so on. The processor is arranged to control operation of the smart card. Particularly, subject to verification of the bearer of the smart card 2, for example by use of a password or PIN and/or via data from the fingerprint sensor 8, the processor is arranged to communicate the data stored on the memory to a card reader.

The additional components 14 may include a battery, which is configured to power the memory and processor. Alternatively, or in addition to the battery, the card may be arranged to be powered via a contact pad external to the smart card 2 or to draw power from the antenna 10 when it is energised by a card reader.

FIG. 5 shows the features of the fingerprint swipe sensor 8. A scan area 16 of sensor is made up of a number of pixels 18 in an array with rows R and columns C. The fingerprint sensor 8 in this embodiment is based on the FPC 1080A fingerprint swipe sensor mentioned above. This sensor is made up of an array of pixels 18 with eight rows R and 128 columns C, with a width of 6.4 mm and a height of 0.4 mm, hence providing a resolution of 508 dpi. It is an active capacitive type sensor. The fingerprint sensor 8 generates an 8-bit grey scale value as a representation of the fingerprint and hence a single frame/image from the sensor 8 is 8 kb large.

An image of the fingerprint is obtained by swiping a finger over the fingerprint sensor 8. When the finger is moved across the fingerprint sensor 8 at an appropriate rate for the frame rate of the fingerprint sensor 8 (i.e. frames per second captured by the sensor) then it is possible to construct an image of a slice of the fingerprint by assembling a number of frames/images captured by the fingerprint sensor 8. A method of combining the captured frames is discussed, for example, in US 2003/0123714.

The smart card 2 of FIGS. 4A and 4B can be produced by any suitable method, for example by a hot lamination method. Conventional processing techniques, which would be well known to the person skilled in the art, may then be applied to the core to complete the card body 4. Such processing techniques may include inking, the formation of an overlaminate film, or the like.

The fingerprint sensor 8 can be fitted to the card body using a method as described below, although other techniques can also be used.

In the preferred method the smart card 2 is first formed with the laminated body 4 enclosing the circuit 6. The circuit 6 includes contacts 12 that are designed to connect with corresponding contacts on the fingerprint area sensor 8, but immediately after the card body is formed these contacts 12 are encased within the laminated body 4.

A cavity is formed in the card body 4 to expose the contacts 12 in the circuit 6. The cavity is formed on an upper surface of smart card body 4 and is sized substantially in conformity with the shape of the fingerprint area sensor 8, such that the fingerprint area sensor 8 will just fit within the cavity. The cavity is milled into the surface of the card body 4. This may be done using a precision end mill or, more preferably, a laser mill. The depth of the milling is set so that the base of the cavity is at the level of the circuit 6 within the card body 4, such that the contacts 12 are exposed.

A conductive epoxy is applied to the surface of the exposed contacts 12 in order to provide the necessary electrical connection between the sensor 8 and the circuit 6. A suitable conductive epoxy is type SEC1222 epoxy, manufactured by Resinlab, LLC of Wisconsin USA, which cures at room temperatures (approx. 25° C.).

Alternatively, a conductive epoxy having a strongly anisotropic characteristic may be used. This is beneficial when the contacts on the fingerprint sensor 8 are very close together because it provides the required conductivity between the fingerprint area sensor 8 and the contacts 12 in the circuit 6, whilst ensuring that even if the conductive epoxy flows between adjacent contacts 12, it will not form any appreciable conductive path between them.

Interior walls of the cavity are coated with an adhesive epoxy prior to the fingerprint sensor 8 being inserted. The adhesive epoxy seals the fingerprint sensor 8 in place.

The fingerprint sensor 8 is then is then aligned with the cavity and pushed into the cavity, such that the contacts on the fingerprint sensor 8 and the contacts 12 in the circuit 6 are brought into electrical contact through the conductive epoxy.

The conductive epoxy and adhesive epoxy preferably cure without heating. However, alternatively, one or both of the conductive epoxy and adhesive epoxy may require heat curing where the curing temperature of the conductive epoxy and/or adhesive epoxy is below a safe temperature of the fingerprint sensor 8, for example below 60° C., which is a typical maximum operating temperature for capacitive sensors of the type used in the preferred embodiment. Higher temperatures may be possible for short time periods and/or for different sensor types.

Whilst the following exemplary methods will be described in relation to the above electronic card, it will be understood that the methods are not limited to this application and may be implemented in any suitable system, such as a computer system having a memory and a processor adapted to receive an input from a fingerprint sensor, or a specialised fingerprint reading/comparing apparatus.

Enrolment

Figure 6:
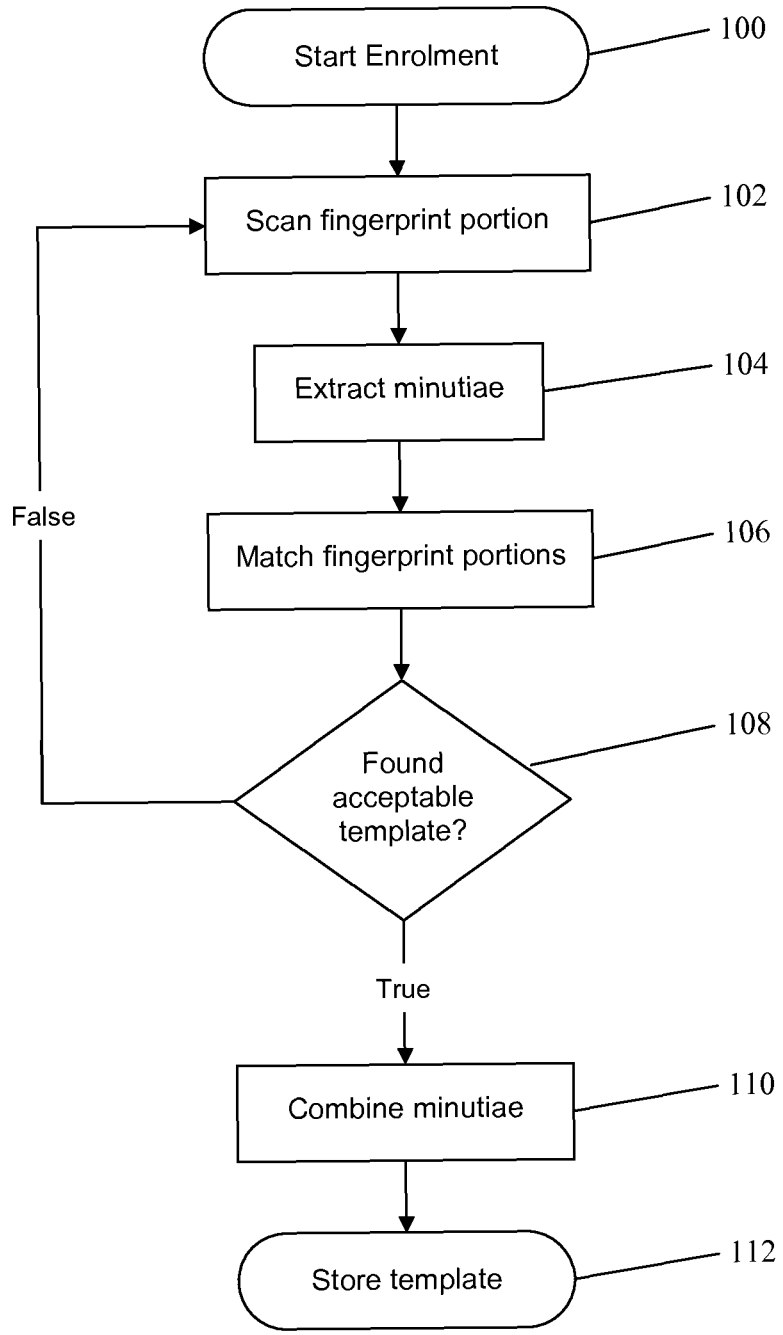
FIG. 6 is a flow chart showing a method of enrolling a fingerprint.

FIG. 6 is a flow chart showing a method of enrolling a reference fingerprint image 20. The method will be described with reference to FIGS. 7 to 9 using an example where the reference fingerprint image 20 to be enrolled is the fingerprint image shown in FIG. 1.

The fingerprint sensor 8 of the smart card 2 is a swipe-type sensor and has scanning area with a width of 6.4 mm, meaning that a scanned portion of a fingerprint will be substantially rectangular. The scanned portion will have a width that is less than the width of the fingerprint, and a length which is longer than the scanned portion's width. Hence, the scanned portion will represent a longitudinal strip of the fingerprint. The following algorithm will assemble three or more intentionally displaced fingerprint scans to produce one wider fingerprint scan to be saved as a template.

Figure 2:
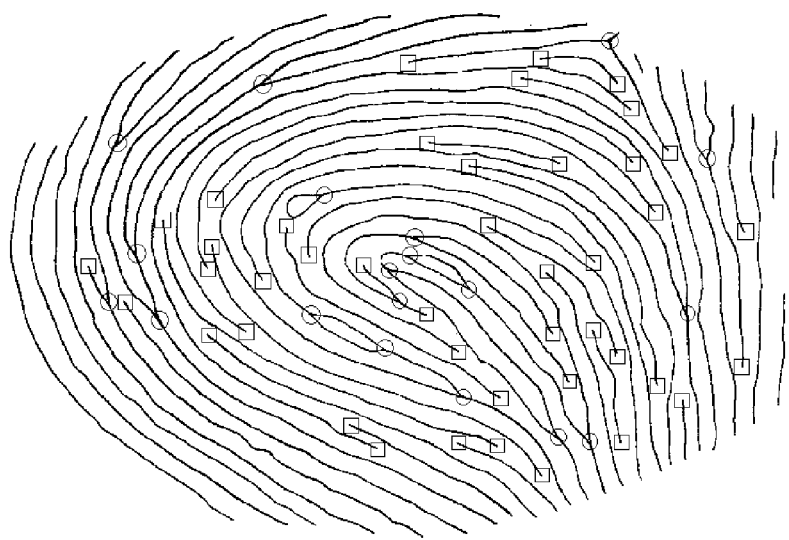
FIG. 2 shows a ridge skeleton of the fingerprint shown in FIG. 1 with ridge endings and ridge bifurcations highlighted.
Figure 1:
FIG. 1 shows a fingerprint image.
Figure 3:
FIG. 3 shows a minutia representation of the fingerprint shown in FIG. 1.
Figure 7:
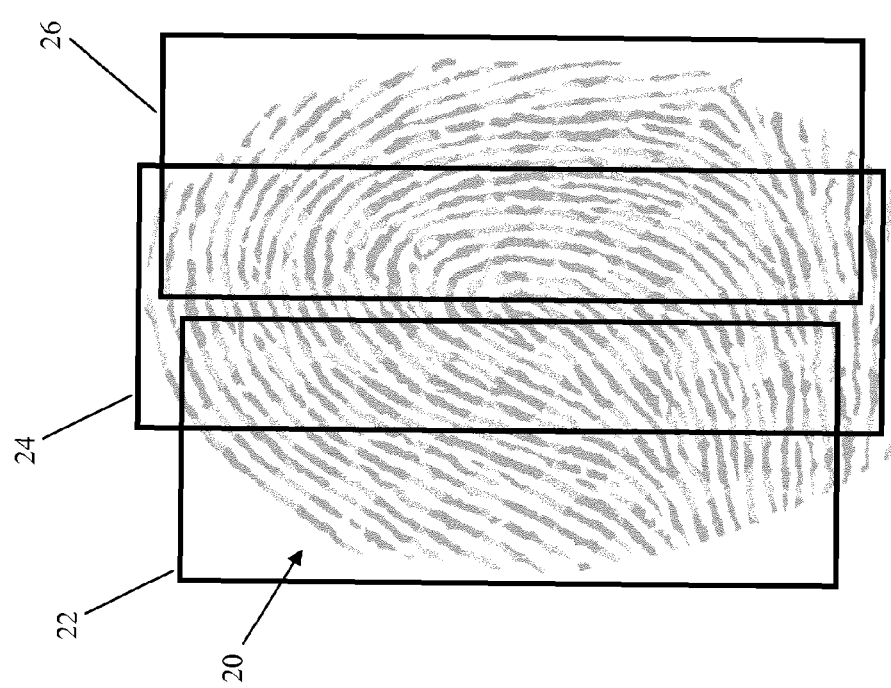
FIG. 7 shows the fingerprint image shown in FIG. 1 with three overlapping strips highlighted.

FIG. 7 shows three exemplary fingerprint image strip 22, 24, 26 of the reference fingerprint image 20 of FIG. 1. As each of the fingerprint image strips 22, 24, 26 has been scanned by the same fingerprint sensor 8, the width of each of the fingerprint image strips 22, 24, 26 is substantially equal, but their lengths may be different. The fingerprint image strips 22, 24, 26 are substantially parallel in their length-wise direction (in the longitudinal direction of the fingerprint). Each of the fingerprint image strips 22, 24, 26 overlaps at least one other fingerprint strip 22, 24, 26 by at least a third of their width.

The algorithm is iterative and will repeat until an acceptable template is found. In order for a template to be deemed acceptable, the following criteria must be met:
  at least three fingerprint image strips 22, 24, 26 have been scanned;
  the at least three fingerprint image strips 22, 24, 26 overlap laterally in series; and
  a width of a region of the fingerprint represented by the overlapped fingerprint image strips 22, 24, 26 is above a predetermined minimum width.

In the first iteration, a first strip 22 of the fingerprint is scanned using the fingerprint sensor 8 to generate a first fingerprint image strip. As discussed above, the first fingerprint image strip 22 has a length that is longer than its width and a width that is less than the width of the reference fingerprint image 20.

Figure 8C:
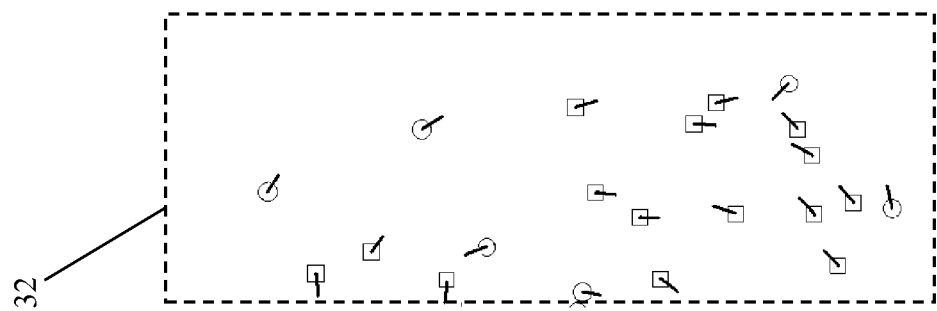
FIGS. 8A-8C show minutia representations of each of the portions in FIG. 7.
Figure 8B:
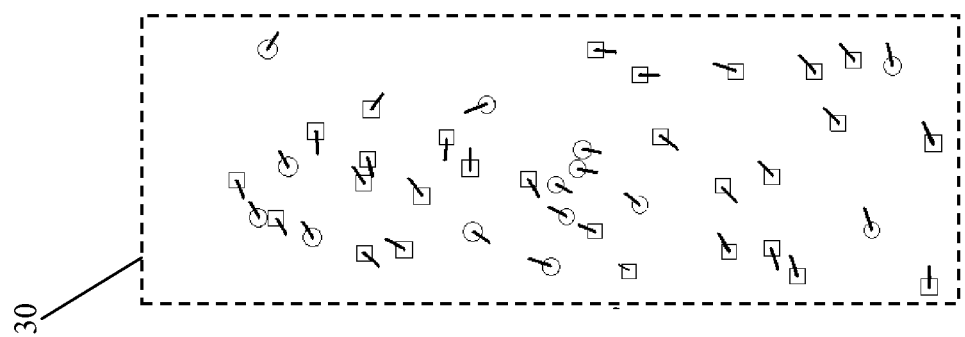
Figure 8A:
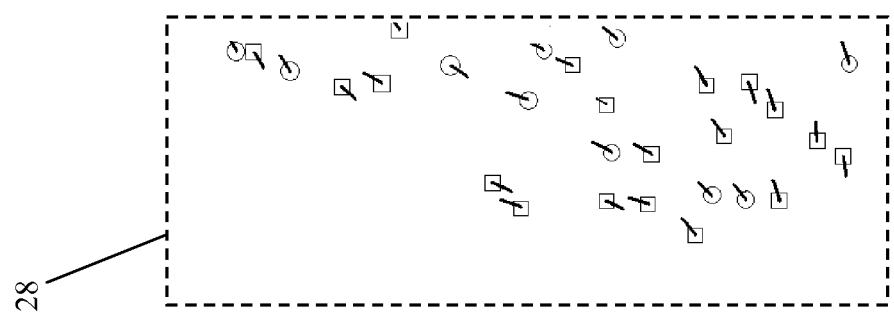

Next, a minutia extraction process is applied to the first fingerprint image strip 22 to determine a minutia representation 28 of the first fingerprint image strip 22. Techniques for minutiae extraction from a fingerprint image are well known in the art and will therefore not be discussed in detail here. FIG. 8A shows a first minutia representation 28 corresponding to the first fingerprint image strip 22 shown in FIG. 7.

Each extracted minutia is stored as a minutia vector, which defines at least a position and a minutia angle of the minutia. The position is defined using Cartesian coordinates relative to a common reference point for all of the minutiae within the minutia representation. Each minutia vector also defines the type of the minutia. The type of minutiae is represented numerically, for example a bifurcation point=1 and a termination point=3. In this embodiment, only bifurcations and terminations are considered as these are simplest to extract, however other types minutiae may additionally or instead be used as required. Thus, the minutia vector for minutia i in a set of minutia vectors composing the minutia representation may be represented as:

$$M_i=[x_i,y_i,\phi_i,t_i],$$

where x is a horizontal position of the minutia, y is a vertical position of the minutia, $\phi$ is a minutia angle of the minutia relative to the horizontal axis (between 180° and −180°), t is a numerical representation of the type of the minutia, and i is an index of the minutia vector within the set of minutia vectors.

Next the first fingerprint image strip 22 is matched against all previously scanned fingerprint image strips. In this first iteration, only one fingerprint strip has been scanned, and therefore this step (which will be described in detail later) does not apply.

The algorithm then determines whether an acceptable template can be formed. In the first iteration, only one fingerprint image strip 22 has been scanned and thus an acceptable template cannot be formed. A second iteration is therefore performed.

In the second iteration, the scanning and extracting are repeated as described above so as to provide a second fingerprint image strip 24 having a second minutia representation 30. FIG. 8B shows the second minutiae representation 28 corresponding to the second fingerprint image strip 24.

Next the second fingerprint image strip 24 is matched against all previously scanned fingerprint image strips, i.e. the second minutia representation 30 is matched with the first minutia representation 28 to determine whether they overlap and, if so, to determine their relative alignment. Each minutia representation is matched against each other minutia representation using a minutia-based matching method. A suitable matching algorithm is described later in detail.

The result from the matching of the first and second fingerprint image strips 22, 24 is a set of the matching parameters which, if the first and second fingerprint image strips 22, 24 overlap, define the number of matching minutiae, an overlap error probability and a relative offset between the minutia representations.

The overlap error probability is the probability that the fingerprint image strips have been erroneously determined as overlapping and the relative minutiae translation is the average difference in relative position between matched minutiae in the first and second minutiae representations 28, 30 of the fingerprint image strips 22, 24. This corresponds to the match error probability that will be discussed later.

The algorithm then determines whether an acceptable template can be formed. In the second iteration, only two fingerprint image strips 22, 24 have been scanned and again an acceptable template cannot be formed. A third iteration is therefore performed.

In the third iteration, the scanning and extracting is repeated as described above so as to provide a third fingerprint image strip 26 having a third minutia representation 32. FIG. 8C shows the third minutiae representation 32 corresponding to the third fingerprint image strip 26.

The third fingerprint image strip 26 is then matched with all previously scanned fingerprint image strips 22, 24, i.e. the third minutia representation 32 is matched with each of the first and second minutia representations 28, 30 to determine whether it overlaps with any or all of these. This is performed by the method discussed above.

The algorithm then determines whether an acceptable template can be formed.

By the third iteration, three fingerprint image strips 22, 24, 26 have been scanned, and thus the first criterion is satisfied.

Based on the matching parameters determined, if a suitable overlap occurs between the fingerprint image strips 22, 24, 26 such that they can be arranged laterally in series, the second criteria is satisfied. A suitable overlap has a number of matched minutiae that exceeds a predetermined minimum number of minutiae for matching and has an overlap error probability beneath a maximum allowable overlap error probability. A set of fingerprint image strips are arranged laterally in series when, between two end fingerprint strips, an unbroken chain of fingerprint strips can be formed having a suitable overlap between each adjacent strip, for example the three fingerprint image strip 22, 24, 26 shown in FIG. 7 are arranged laterally in series.

If the three fingerprint image strips 22, 24, 26 can be arranged laterally in series, then the width of the represented region of the fingerprint is equivalent to the sum of the widths of each of the arranged fingerprint image strips, minus the sum of the widths of the overlapping regions. If the width of this represented region exceeds a predetermined minimum width, then an acceptable template can be formed.

If an acceptable template cannot be formed, then further iterations are performed until an acceptable template can be formed from three or more of the scanned representations.

When an acceptable template can be formed, a reference fingerprint image template 34 is created.

Figure 9:
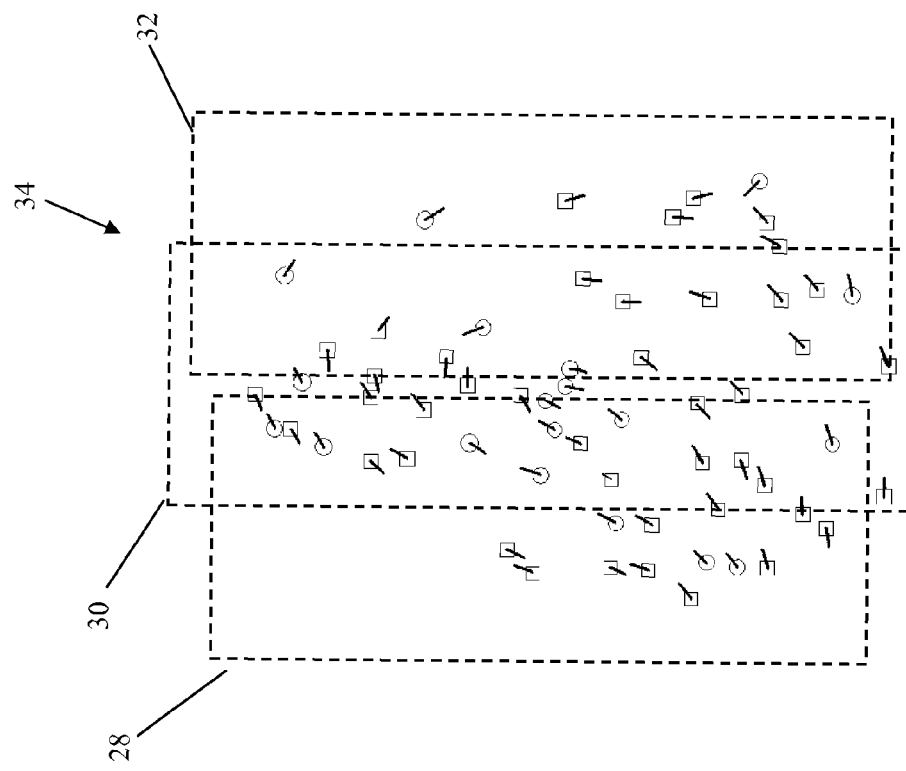
FIG. 9 shows a minutia representation of the fingerprint shown in FIG. 7 composed of the minutiae representations shown in FIGS. 8A-8C.

First, one of the fingerprint image strips 22, 24, 26 is selected as a reference fingerprint image strip. The minutiae representations of the other fingerprint image strips 22, 24, 26 are translated based on their matching parameters so as to be aligned relative to the reference fingerprint image strip. The aligned minutiae representations of the fingerprint image strips 22, 24, 26 are shown in FIG. 9.

The reference fingerprint image template 34 is formed by taking the union of the minutiae of all of the matched minutia representations which compose the acceptable template.

The enrolment process is then successfully terminated.

Whilst in the above described embodiment, the combining of the minutia is performed after determining that an acceptable template can be formed, it will be apparent that the minutia of each fingerprint image strip may alternatively be combined sequentially with those of the previously scanned fingerprint image strips upon each iteration of the method.

Matching

Figure 10:
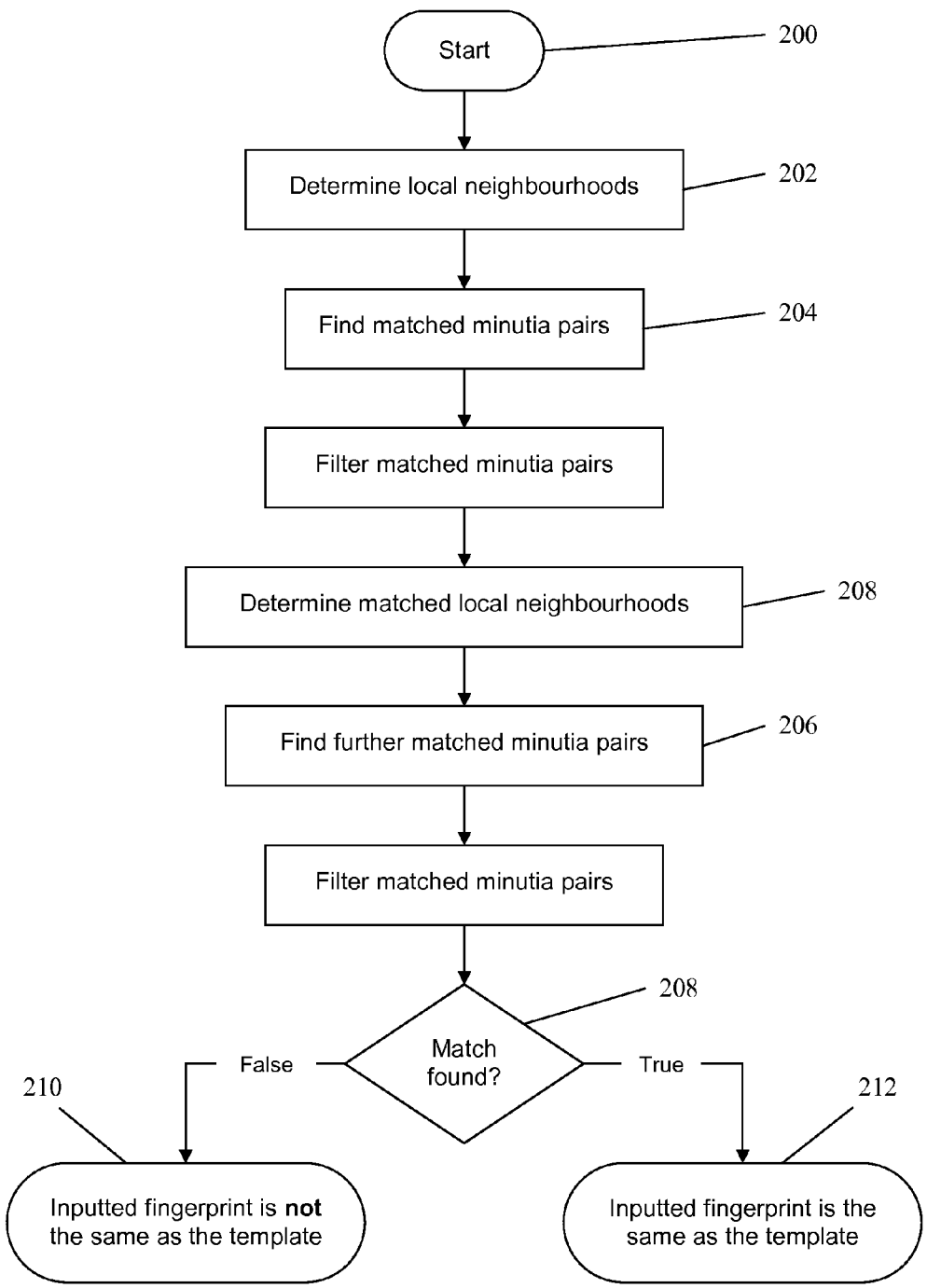
FIG. 10 is a flow chart showing a method of comparing an inputted fingerprint with a reference fingerprint image.
Figure 12:
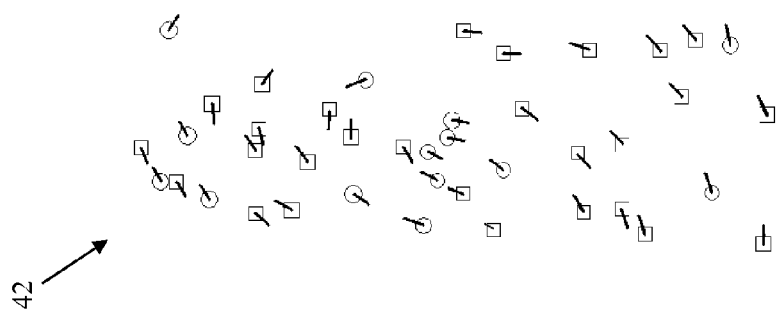
FIG. 12 shows a minutia representation of the portion shown in FIG. 11.
Figure 11:
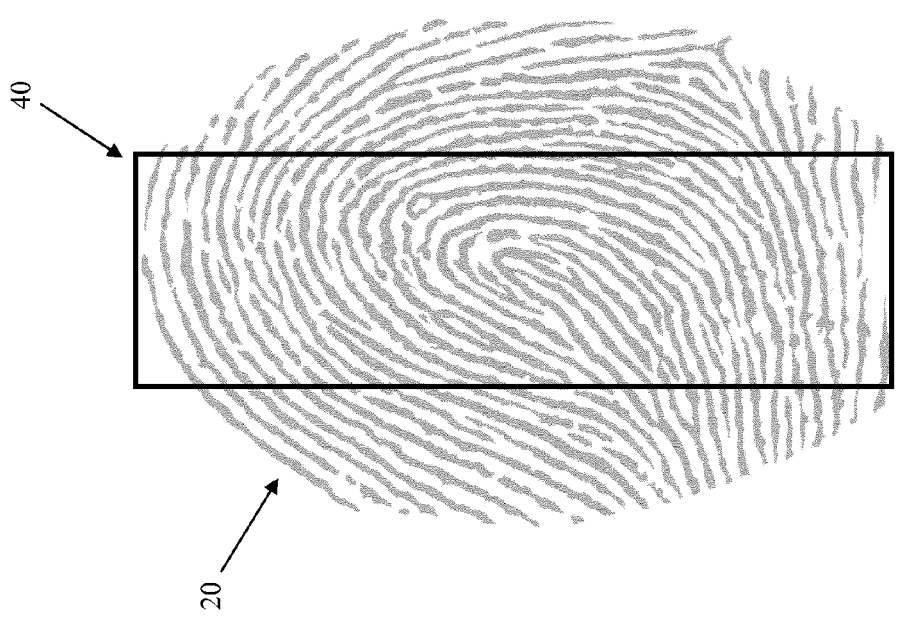
FIG. 11 shows the fingerprint image shown in FIG. 1 with a portion highlighted.

FIG. 10 is a flow chart showing a method of matching a first fingerprint to a second fingerprint for verifying the identity of the owner of the first fingerprint. The method will be described with reference to FIGS. 11 to 16 using an example where the first and second fingerprints are both scanned from the same finger, i.e. they match. The first fingerprint is a reference fingerprint image 20 and second fingerprint is an input fingerprint image 40. In this example, the reference fingerprint image 20 is a substantially complete fingerprint image 40 as shown in FIG. 11 and the input fingerprint image 40 is a portion 40 of the fingerprint image 20 shown in FIGS. 11 and 12. The fingerprint image 20 shown in FIG. 11, corresponds to the fingerprint images 20 shown in FIGS. 1 and 7.

The reference fingerprint image 20 has been enrolled by the above enrolment method using the fingerprint sensor 8 and is stored on the memory of the electronic card 2. The input fingerprint image 40 has been input by the fingerprint sensor 8. As the reference fingerprint image 20 and the input fingerprint image 40 have been scanned using the same fingerprint sensor 8, factors such as the resolution and quality of the two fingerprint images are consistent.

In alternative embodiments, other methods of input may also be used. For example, the reference fingerprint image 20 may be enrolled using an external fingerprint sensor 8 that is sufficiently large so as to capture the entire fingerprint. Also, the reference fingerprint image 20 may not be a complete fingerprint image, for example when the method is applied to match minutia representations of two fingerprint image strips, as in the enrolment method described above.

The first step of the matching method is to provide data defining a first set of minutiae 34 representing the reference fingerprint image 20, i.e. the reference fingerprint image template 34 enrolled previously, and a second set of minutiae 42 representing the input fingerprint image 40. The data comprises a first set of minutia vectors, defining the first set of minutiae, and a second set of minutia vectors, defining the second set of minutiae. The minutia vectors are as defined above. The first set of minutia vectors are retrieved from the memory. The second set of minutia vectors are received directly from the fingerprint sensor 8.

Next the first set of minutiae 34 and the second set of minutiae 42 are locally matched using local neighbourhoods 48.

Figure 13:
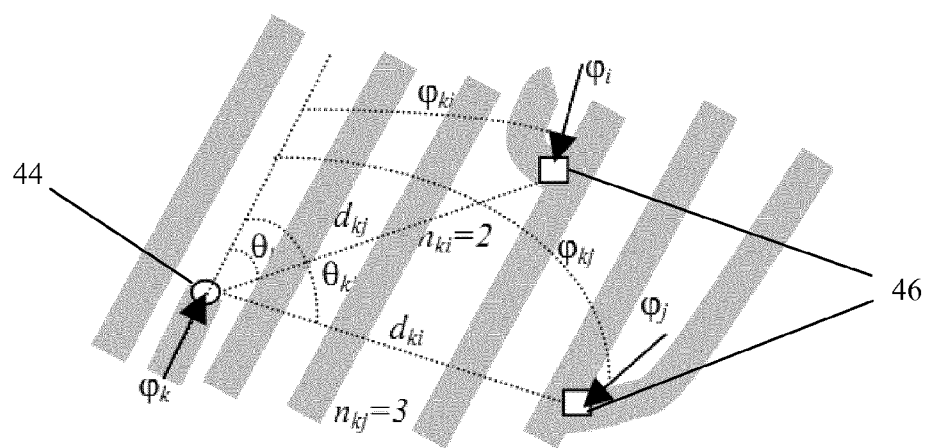
FIG. 13 shows a relationship between a central minutia and two neighbouring minutiae.

FIG. 13 shows a local neighbourhood 48 comprising a central minutia 44 and two neighbouring minutia 46. Each local neighbourhood 48 is centred around one minutia, which will be referred to as the central minutia 44, and comprises neighbouring minutiae 46 of the central minutia 44. The neighbouring minutiae 46 are any set of minutiae that may be consistently selected based on the central minutia 44, but must comprise at least one minutia, other than the central minutia 44 itself.

In this preferred embodiment, the neighbouring minutiae 46 consist of the closest n minutiae, i.e. the n minutia with the shortest distance from the central minutiae 44. The integer n may be any number of minutiae, for example the closest one, two, three, four, etc. minutiae. Whilst a larger number of neighbouring minutiae 46 is desirable in order to improve the probability of capturing at least one neighbouring minutia 46 that appears in both sets of minutiae 34, 42, as will become apparent later, the number of matching steps in the following method increases proportionally with the square of the number of neighbouring minutiae in each neighbourhood. The inventors have identified that the use of the three closest neighbouring minutiae 46 provide optimal matching in the present embodiment; however, greater or fewer neighbouring minutiae 46 points may be optimal in other situations. For example, in situations where a sensor is more prone to false or missing minutiae, it may be desirable to include more neighbouring minutiae 46 in the local neighbourhoods 48, despite the increase in processing time.

The neighbouring minutiae 46 may alternatively include all minutiae within a predetermined distance of the central minutiae 44 and/or may be limited to minutiae of only a single type, such as the same type as the central minutia 44. The considerations discussed above regarding the number of neighbouring minutiae still apply in such embodiments.

For each local neighbourhood 48, a local minutia vector is generated. That is to say, a first set of local minutia vectors are generated based on the first set of minutia vectors and a second set of local minutia vectors is generated based on the second set of minutia vectors. Each local minutia vector corresponds to one of the minutia vectors and defines the relationship between the respective minutia, as the central minutia 44, and all of its neighbouring minutiae 46 within the local neighbourhood 48.

Each local minutia vector defines: distances between the central minutia 44 and each of the neighbouring minutiae 46; relative radial angles for each neighbouring minutiae 46, which are the relative angles between the minutia angle of the central minutia 44 and lines connecting the central minutia 44 and each of the neighbouring minutiae 46; and relative minutia angles for each neighbouring minutia 46, which are the relative angle between the minutia angle of each of the neighbouring minutiae 46 and the minutia angle of the central minutia 44. A local minutia vector may additionally define the types of the central minutia 44 and of its neighbouring minutiae 46.

In this embodiment, a local minutiae vector is composed of a plurality of local feature vectors. A local minutiae vector has a local feature vector for each neighbouring minutia 46 of the central minutia 44. Each local feature vector defines the relationship between the central minutiae 44 and that neighbouring minutia 46 and includes at least the relative distance, the radial angle and the minutia angle between the central minutia 44 and the respective neighbouring minutia 46. Thus, a local feature vector for minutia k and neighbouring minutiae 46 i may be represented as:

$$LF_{ki} = [d_{ki}, \theta_{ki}, \phi_{ki}],$$

where $d_{ki}$ is the distance between the central minutia 44 and neighbouring minutia 46 i, $\theta_{ki}$ is the relative radial angle of the neighbouring minutia 46 i (between 180° and −180°), $\phi_{ki}$ is the relative minutia angle of the neighbouring minutia 46 i (between 180° and −180°), k is index of the central minutia and i is the index of the neighbouring minutia vector within the set of minutiae. Minutia angle of the central minutia is used as a angle reference.

That is to say, $$d_{ki} = \sqrt{(x_i - x_k)^2 + (y_i - y_k)^2}$$

$$\theta_{ki} = \tan^{-1}\left(\frac{y_i - y_k}{x_i - x_k}\right) - \varphi_k$$

$$\varphi_{ki} = \varphi_i - \varphi_k,$$

where $x_k$, $y_k$, and $\phi_k$ are the horizontal position, vertical position, and minutia angle, respectively, of the central minutia 44, and $x_i$, $y_i$, and $\phi_i$ are the horizontal position, vertical position, and minutia angle, respectively, of neighbouring minutia 64 i.

Alternatively, where a constant number of neighbouring minutiae 46 are selected for each central minutia 44, the local minutia vector for a minutia may be represented as a vector of constant size. For example, when n=3, the local minutia vector for minutia k, where minutiae i, j and l are the closest neighbouring minutiae 46, may be represented as:

$$L_k = [d_{ki}, d_{kj}, d_{kl}, \theta_{ki}, \theta_{kj}, \theta_{kl}, \phi_{ki}, \phi_{kj}, \phi_{kl}, t_i, t_j, t_l],$$

where $d_{ki}$ is the distance between minutia i and minutia k, etc., $\theta_{ki}$ is the relative radial angle of minutia i and k (between 180° and −180°), etc., $\phi_{ki}$ is the relative minutia angle of minutia i and k (between 180° and −180°), etc., $t_i$ is a numerical representation of the type of the minutia, and i is index of the local minutia vector within set s.

Each local minutia vector is rotation and translation invariant, i.e. its values are independent of the orientation and position of the fingerprint image 20, 40. For example, if the fingerprint image 20, 40 were to be rotated and/or translated, the minutiae vectors would change, but the local minutiae vectors would not. This is useful because aligning the orientation and position of the two fingerprints 20, 40 is computationally intensive.

In the preferred embodiment, the distance between minutiae is measured in pixels. This does not affect the comparison because the reference fingerprint image 20 and the input fingerprint image 40 have been scanned using the same fingerprint sensor 8 and thus the resolution of each of the two fingerprint images 20, 40 is the same. However, where different sensors have been used, for example when the reference fingerprint image 20 has been pre-scanned using a high resolution scanner, the reference fingerprint image 20 and the input fingerprint image 40 may have different resolutions (measured, for example, using dots per inch). The local minutia vector may be made scale invariant by using a ridge count between minutiae instead of a pixel count to measure distance. In yet a further alternative, where the respective resolutions of the two sensors are known or can be calculated, a scaling factor may be applied to the position data of the one (or both) of the first and second sets of minutia vectors so as to make the scales consistent.

The first set of local minutia vectors and the second set of local minutia vectors are then matched to obtain a set of matched minutia pair vectors. The matching comprises comparing each local minutia vector in the first set of local minutia vectors with each local minutia vector in the second set of local minutia vectors, and generating a matched minutia vector when it is determined that two local minutia vectors match. Each matched minutia pair vector defines a minutia in the first set of minutiae and a minutia in the second set of minutiae which are considered to correspond to a single matched minutia 50.

In the comparison of a first local minutia vector, representing a local neighbourhood 48 of the reference fingerprint image 20, and a second local minutia vector, representing a local neighbourhood 48 of the input fingerprint image 40, each local feature vector of the first local minutia vector is compared with each local feature vector of the second local minutia vector. That is to say, each relationship between the central minutia 44 of the local neighbourhood 48 of the reference fingerprint image 20 and each of its neighbouring minutiae 46 is compared with each relationship between the central minutia 44 of the local neighbourhood 48 of the input fingerprint image 40 and each of its neighbouring minutiae 46. The number of comparisons is therefore equal to the product of the number of neighbouring minutiae 46. For example, where each local neighbourhood 48 consists of three neighbouring minutiae, there are nine comparisons made for each pair of local minutia vectors.

Based on the above comparison of local feature vectors, an optimal correspondence is determined between the first local minutia vector and the second local minutia vector. When the number of neighbouring minutiae is constant, each local feature vector in the first local minutia vector is associated with the most closely matching local feature vector in the second local minutia vector, i.e. the local feature vector having the lowest deviation. Suitable methods for determining optimal correspondence will be apparent to those skilled in the art.

A matched minutia candidate is determined when a deviation between at least one local feature vector of the first local minutia vector and the associated local feature vector of the second local minutia vector is below a predetermined local feature deviation threshold. The local feature deviation threshold defines a maximum allowable difference between the values of the local feature vector of the first and second local minutia vectors for each of distance, relative radial angle, and relative minutia angle between the respective central minutia 44 and neighbouring minutia 46. Other embodiments may improve the accuracy of the matching by only determining a match when at least two of, or even all of, the local feature vectors having an associated local feature vector have a deviation from their associated local feature vector below the predetermined local feature deviation threshold.

The matching next comprises determining a local similarity score for each matched minutia candidate. Where the local similarity score meets a predetermined threshold local similarity score, a matched minutiae pair vector is created for those corresponding minutiae.

The local similarity score between two local minutiae vectors is calculated based on a weighted absolute difference between at least one pair of associated local feature vectors, for example the local minutiae vectors having a deviation below the predetermined local feature deviation threshold. The following equation may be used to determine a local similarity score Ls where local feature vector $LF_1$ in the first local minutia vector matches local feature vector $LF_2$ in second local minutia vector:

$$Ls(i, j) = \begin{cases} \dfrac{t - |W \cdot (LF_1 - LF_2)|}{t}, & |W \cdot (LF_1 - LF_2)| < t \\ 0, & |W \cdot (LF_1 - LF_2)| \geq t \end{cases},$$

where t is a threshold value, W is a weighting vector, $LF_1$ is a local feature vector in the first local minutia vector, and $L_2$ is a local feature vector in the second local minutia vector.

The weighting vector is a predetermined vector that allows the different measures to be compared. The threshold value is calculated based on the local feature deviation threshold and the weighting vector. When the vectors are considered a match, the above equation will give a local similarity score between 1 and 0, with 1 being a perfect match and 0 being at the maximum allowable deviation. The weighting vector is determined empirically based on test data.

Each minutia should not appear in more than one matched minutiae pair vector as a minutia in one set cannot be the same as two minutiae in the other set. Where a minutia appears in two or more matched minutiae pair vectors, the matched minutiae pair(s) not having the highest local similarity score are removed such that no minutia appears in more than one matched minutiae pair vector within the set of matched minutia pair vectors. This may be done, for example, by ranking the set of minutiae pair vectors based on their local similarity score and processing them sequentially, in decreasing local similarity score order, and removing any minutia pair vectors including a repeated minutia (i.e. a minutia that has been matched to another minutiae with a higher local similarity score) as they are encountered.

In addition to defining a minutiae in the first set of minutiae and minutiae in the second set of minutiae, each matched minutiae pair vector further defines the local similarity score between those minutiae, as well as a horizontal (x-direction) deviation, a vertical (y-direction) deviation and a minutia angle deviation between the corresponding minutia vectors in the first and second sets of minutia vectors. The horizontal, vertical and minutia angle deviations respectively correspond to the difference in absolute horizontal position, absolute vertical position and absolute minutia angle between the minutia in the first set and the minutia in the second set.

Thus, a matched minutia pair vector for minutia points i in the first set and j in the second set may be represented as:

$$MP_{ij} = [i, j, dx, dy, d\phi, Ls],$$

where i is the index of the minutia in the first set of minutiae, j is the index of the minutia in the second set of minutiae, dx is difference between $x_{1i}$ and $x_{2j}$, dy is the difference between $y_{1i}$ and $y_{2j}$, $d\phi$ is the difference between $\phi_{1i}$ and $\phi_{2j}$, and Ls is the similarity between local minutia vector i in the first set of local minutia vectors and local minutia vector j in the second set of local minutia vectors.

After the first and second sets of local minutia vectors have been matched, the matched minutiae 50 are then filtered. The filtering is performed based on the absolute positions of the matched minutiae 50 within the first and second sets minutiae 34, 42, i.e. based on the first and second sets of minutiae vectors.

The step of filtering is optional, but is beneficial in that it removes at least some matched pairs that do not correctly define a matched minutia 50. In some cases, because the minutiae have been compared using only a local frame of reference, it is possible for a minutia in the first set may to be matched with minutia in the second set having similar neighbouring minutiae 46, but which do not represent the same minutia. Where the two fingerprint images 20, 40 match, this error will typically become apparent when comparing the absolute positions of the first and second minutiae in their respective fingerprint images because the minutia represented by each of the minutia vectors will be in different places on the fingerprint images 20, 40.

In the preferred embodiment, the reference fingerprint image 20 and the input fingerprint image are scanned using the same fingerprint sensor 8. Therefore, their orientation and resolutions are substantially the same. Thus, if two minutiae vectors have been matched correctly, i.e. they represent the same minutia, a difference in horizontal and vertical displacement of that minutia between the first and second sets of minutia vectors should be similar to those of other correctly matched minutiae 50.

The filtering is performed using a sliding window algorithm having a predetermined tolerance. The tolerance defines the size of a range from a lower limit to an upper limit for each of a dx range and a dy range. The tolerance may be set during manufacture to values having been determined empirically based on test data previously. Alternatively, the tolerance values may be calculated dynamically for each comparison and may, for example, be based respectively on the variance of the dx and dy values of the matched pairs.

Figure 14:
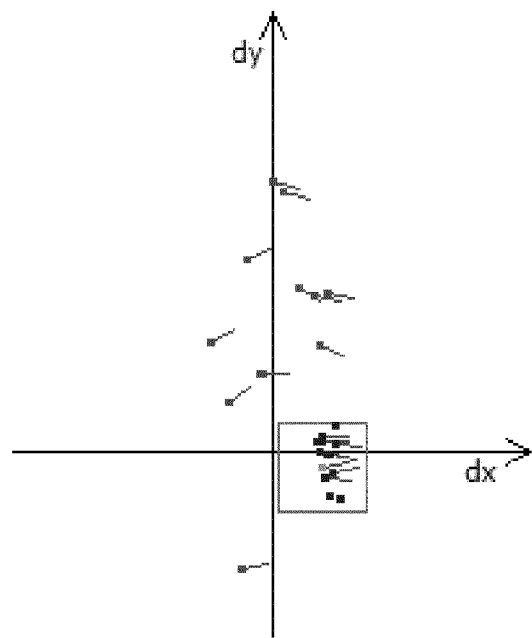
FIG. 14 shows a filter applied to a plot of relative displacement and orientation for matched minutiae between the representation shown in FIG. 2 and the representation shown in FIG. 12.

FIG. 14 shows a graphical representation of the application of the sliding window algorithm. The window defines a dx range and a dy range having a fixed tolerance. Any matched minutiae pair vectors having either a dx or dy value outside of either of the ranges are removed. The ranges are selected so as to capture the maximum number of matched minutiae pair vectors. Centre values of the dx and dy ranges of the window are positioned at points corresponding to the median dx and dy values respectively for the set of matched minutia pair vectors.

In an alternative arrangement the reference fingerprint image 20 and the input fingerprint image 40 may not share a common orientation, such as where the reference fingerprint image 20 and the input fingerprint image 40 are not scanned using the same fingerprint sensor 8. This may be detected based on an average of the dϕ values. Where this average dϕ is about zero, or at least within of a set range (such as within about ±10 degrees), the fingerprints may be considered as being substantially aligned. Where the average dϕ is not about zero, the rotational offset will affect the relative displacements of different minutiae pairs differently. In such cases, a transformation may need to be applied to the x and y values of either the first or the second set of minutia points in order to correctly align the first and second data points to apply the above filtering algorithm Following the filtering, the remaining matched minutiae pair vectors are considered define matched minutiae 50, i.e. each matched minutiae pair vector is considered to represent a common minutia appearing in both the first and second sets of minutiae. Matched minutiae pairs that were removed by the filtering are considered to have defined two unmatched minutiae.

The first and second sets of minutiae 34, 42 will typically not correspond exactly. This may be for a number of reasons including errors when scanning the print and extracting the minutiae meaning that not all of the minutiae are extracted or that false minutiae are scanned. Additionally, where the inputted (or reference) fingerprint image 40 is a partial fingerprint image 40, a number of minutiae of the complete fingerprint image 20 will be outside of the partial fingerprint image 40 and thus cannot be extracted from the partial fingerprint image 40. The fingerprint sensor 8 used in this example has a narrow width meaning that all scanned fingerprints will therefore be partial fingerprints. However, even larger fingerprint sensors may scan only partial fingerprints, such as if there is a fault with a portion of the scan area, where a part of the sensor or the fingerprint is obscured, or where the finger is not correctly aligned with the scan area of the fingerprint sensor 8.

When the minutia in the first and second sets of minutiae 34, 42 do not correspond exactly, a minutia may appear in both the first and second sets of minutiae, but may not be matched because it has a different local neighbourhood 48 in each of the sets, i.e. one or more of its neighbouring minutiae 46 do not appear in both the first or second sets of minutiae 34, 42. That is to say, if the neighbouring minutiae 46 of a central minutia 44 in either of the first or second sets of minutiae 34, 42 include false minutiae or should include minutiae that were not scanned, that central minutia 44 cannot be matched based on those local minutiae vectors.

Figure 15B:
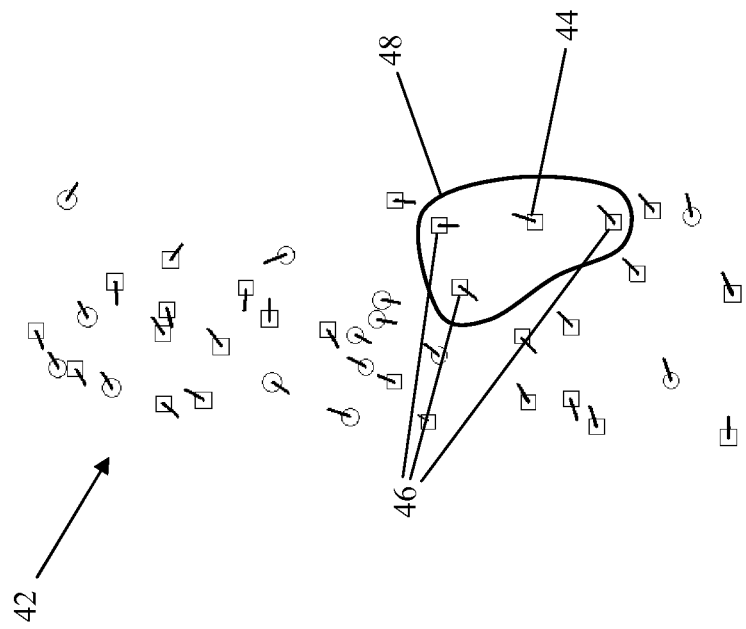
FIG. 15B shows a relationship between the same central minutia and its three closest neighbouring minutiae in the portion representation shown in FIG. 12.
Figure 15A:
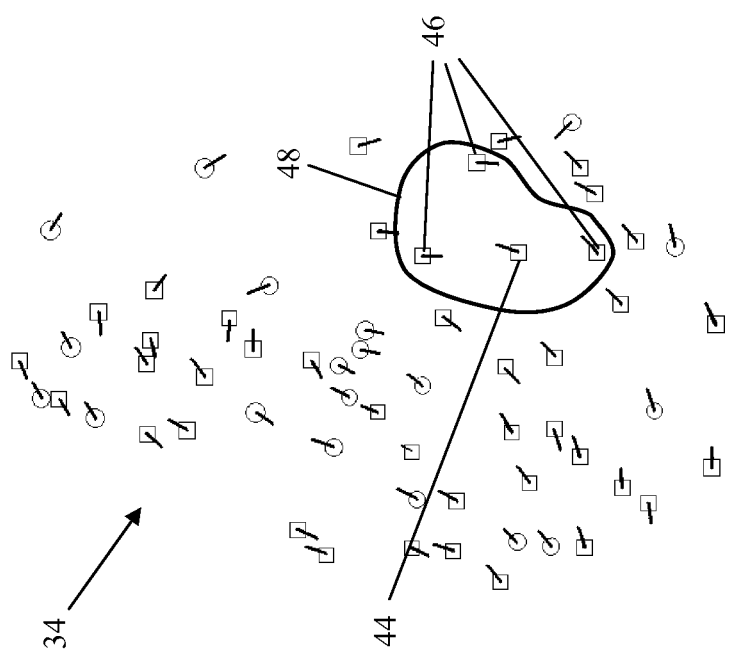
FIG. 15A shows a relationship between a central minutia and its three closest neighbouring minutiae in the fingerprint representation shown in FIG. 2.

This can be seen with reference to the example shown in FIGS. 15A and 15B. These figures show a local neighbourhood 48 including the three closest neighbouring minutiae 46 to a central minutia 44. As can be seen in FIG. 15A, the local neighbourhood 48 for the reference fingerprint image 20, which is a complete fingerprint, includes a missing minutia that is not present in the input fingerprint image 40, shown in FIG. 15B, which is a partial fingerprint. As such, although the central minutia 44 of this local neighbourhood 48 appears in both the reference fingerprint image 20 and the input fingerprint image 40, it cannot be matched as its local neighbourhood 48 is different in the two fingerprint images 20, 40.

According to the present method, the first set of minutiae 32 and the second set of minutiae 42 are then matched in a second step of matching using matched local neighbourhoods 54. The matched local neighbourhoods 54 are similar to the above described local neighbourhoods 48, but only include matched neighbouring minutiae 52.

The matched neighbouring minutiae 52 of a central minutia 44 comprise a set of minutiae that can be consistently selected based on the central minutia 44, where those minutiae are also matched minutiae 50, i.e. they were matched previously to a minutia in the other set of minutiae 34, 42. The matched neighbouring minutiae 52 must comprise at least one minutia, other than the central minutia 44 itself.

In this preferred embodiment the matched neighbouring minutiae 52 are the closest three matched neighbouring minutia 52. That is to say, they are the closest three matched minutiae 50 to the central minutia 44.

New local minutiae vectors are determined for the matched local neighbourhoods 54 of minutiae that were not previously matched (i.e. those minutiae that are not matched minutiae 50), these local minutiae vectors are referred to as the unmatched local minutiae vectors.

Figure 16B:
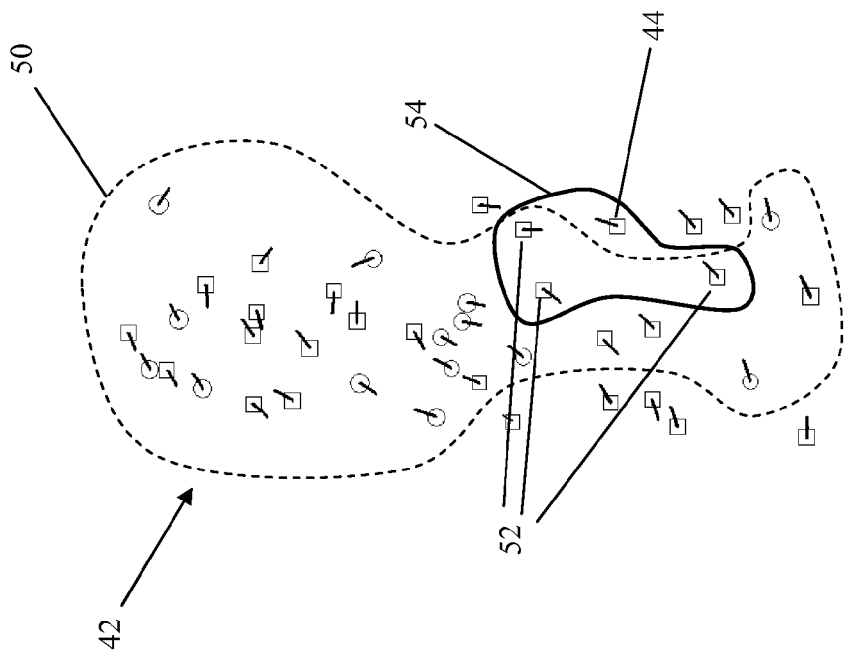
FIG. 16B shows a relationship between the same minutia and its three closest neighbouring matched minutiae in the portion representation shown in FIG. 12.
Figure 16A:
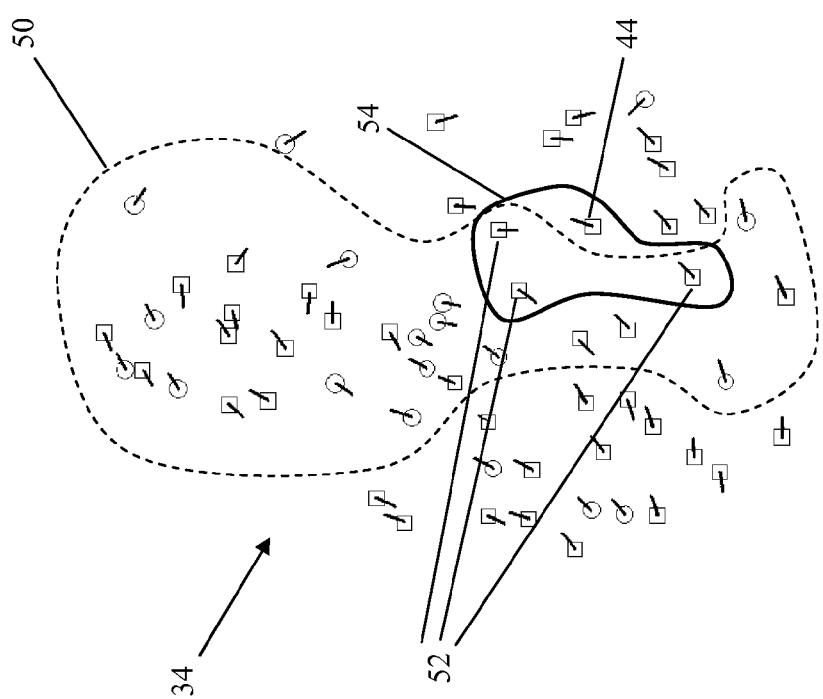
FIG. 16A shows a relationship between the same minutia and its three closest neighbouring matched minutiae in the fingerprint representation shown in FIG. 2.

FIGS. 16A and 16B show the matched local neighbourhoods 54 for the same central minutia 44 as in FIGS. 15A and 15B. These Figures also highlight the set of matched minutiae 50 that appear in both sets of minutiae. As can be see, because the matched local neighbourhoods 54 are defined only with reference to minutia appearing in both the reference fingerprint image 20 and the input fingerprint image 40, the same matched local neighbourhood 54 is determined for both sets of minutiae 34, 42. Thus, these minutiae can now be matched using their matched local neighbourhoods 54.

The unmatched local minutiae vectors corresponding to the first and second sets of minutiae 34, 42 are then matched to produce a further set of matched minutiae pairs. This further set of matched minutiae pairs is then combined with the previously determined set of matched minutiae pairs. The matching is performed by the method discussed above.

Where a minutia appears in both the first and second sets of minutiae 34, 42, but was not matched previously due to a false or missing minutiae being included in one of the minutia's local neighbourhood 48 but not the other, this subsequent step of matching should correctly match the minutiae in the two sets. This is because this step of matching is based on a matched local neighbourhood 54, which only includes matched minutiae 50, i.e. minutiae appearing in both sets, and therefore will not include those false or missing minutiae.

As above, each minutia cannot appear in more than one matched minutiae pair vector. Therefore, where a minutia appears in two or more matched minutiae pair vectors, the matched minutiae pair(s) not having the highest local similarity score are removed such that no minutia appears in more than one matched minutiae pair vector.

After the first and second sets of unmatched local minutia vectors have been matched, the matched minutiae 50 are filtered. The filtering is again performed based on the relative absolute positions of the minutiae between the first and second sets.

This step of filtering is also optional, but provides similar benefits to the step of filtering above. Particularly, as the matching is based only on a local coordinate system, the absolute positions of matched minutiae 50 in the first and second sets of minutiae 34, 42 should be compared to remove pairs having significantly different relative absolute positions.

The filtering is preferably performed using the sliding window function discussed above. In this embodiment, all of the matched minutiae 50 are filtered (i.e. those determined by both the first and second steps of matching). Alternatively, but less preferred, only the matched minutiae 50 that have not been filtered previously may be filtered.

It is then determined whether the reference fingerprint image 20 and the input fingerprint image 40 match. This is based at least in part on the number of matched minutiae 50 (i.e. the number of matched minutiae pair vectors), and also on the number of minutiae in the first set of minutiae 34 and the number of minutiae in the second set of minutiae 42. The determination is preferably based on a set of statistical parameters including at least one of: the number of matched minutiae 50; the number of minutiae in the first set of minutiae 34; the number of minutiae in the second set of minutiae 42; the number of matched minutiae 50 of the same minutia type; the number of matched minutiae 50 having a similarity above a predetermined threshold; and the area occupied by the matched minutiae 50.

In the preferred embodiment, the reference fingerprint image 20 and the input fingerprint image 40 are considered to be matched if d is true for the following equation:

$$d = p_e < \text{matchTresh} \wedge n_m > \text{matchesNumMin}$$
$$\wedge\, a > \text{areaMin},$$

where $n_m$ is the number of matched minutiae 50, a is the area of overlap between the reference fingerprint image 20 and the input fingerprint image 40, and $p_e$ a match error probability calculated as the product of three independent probabilities:

$$p_e = p_{me} * p_{te} * p_{pe}$$

Term $p_{me}$ is the probability for a randomly generated set of input minutia features to be matched to subset of template features looking only at minutia position, and is determined as by:

$$p_{me} = \sum_{k=n_m}^{n_{fT}} \binom{n_f}{k} p^k (1-p)^{n_f - k}$$

where p is probability for one randomly generated minutia to be matched with one minutia from the first (template set).

Term $p_{te}$ is the probability that there are $n_t$ randomly generated minutiae which have same type as matching minutiae from the template. Term $p_{pe}$ denotes probability that there are $n_p$ matched minutiae with very high similarity score, higher than certain constant threshold $p_{p1}$, which is determined experimentally. Introduction of $p_{pe}$ improves overall performance, because it reduces possibility of accidental matching.

$$p_{te} = \binom{n_m}{n_t}(0.5)^{n_t}$$

$$p_{pe} = \binom{n_m}{n_p} p_{p1}^{n_p}$$

By the method described above, two fingerprints may be efficiently and effectively matched, even when one or both of the fingerprints is a partial fingerprint or is prone to false or missing minutiae.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method of enrolling a fingerprint comprising:
   receiving a first fingerprint image strip, a second fingerprint image strip and a third fingerprint image strip, each fingerprint image strip representing a portion of the fingerprint and the second and third fingerprint image strips overlapping the first fingerprint image strip,
   wherein the fingerprint image strips are input using a swipe-type fingerprint sensor having a rectangular scan area where a width of a long side thereof is less than 10 mm;
   extracting minutiae from each of the first, second and third fingerprint image strips;
   matching the extracted minutiae of the first, second and third fingerprint image strips to determine relative positions of the fingerprint image strips;
   combining the minutiae of the first, second and third fingerprint image strips based on their relative positions to produce a combined set of minutiae representing a larger portion of the fingerprint; and determining that the fingerprint has been successfully enrolled if a width of the larger portion of the fingerprint is greater than a predetermined minimum width;

wherein matching the extracted minutiae of at least two of the first, second and third fingerprint image strips comprises:

determining a first local neighbourhood for each extracted minutiae of one of the fingerprint image strips and for each extracted minutiae of another of the fingerprint image strips, wherein each first local neighbourhood includes at least one extracted minutia neighbouring the respective extracted minutia;

comparing the first local neighbourhoods of the extracted minutiae of the one of the fingerprint image strips with the first local neighbourhoods of the extracted minutiae of the other of the fingerprint image strips to determine matched minutiae appearing in both the extracted minutiae of the one of the fingerprint image strips and the extracted minutiae of the other of the fingerprint image strips;

determining a second local neighbourhood for each unmatched extracted minutiae of the one of the fingerprint image strips and in the other of the fingerprint image strips, wherein each extracted minutia that is not a matched minutia is an unmatched extracted minutia, and wherein each second local neighbourhood includes at least one matched minutia neighbouring the respective unmatched extracted minutia;

comparing the second local neighbourhoods of the unmatched extracted minutiae of the one of the fingerprint image strips with the second local neighbourhoods of the unmatched extracted minutiae of the other of the fingerprint image strips to determine further matched minutiae appearing in both the extracted minutiae of the one of the fingerprint image strips and the extracted minutiae of the other of the fingerprint image strips, wherein the relative position of fingerprint image strips is determined also based on the further matched minutia.

2. A method as claimed in claim 1, further comprising:
if the width of the larger portion of the fingerprint is not greater than the predetermined minimum width, receiving subsequent fingerprint image strips until the width of the larger portion of the fingerprint is greater than the predetermined minimum width.

3. A method as claimed in claim 1, wherein receiving the first, second and third fingerprint image strips, wherein the second and third fingerprint image strips overlap the first fingerprint image strip, comprises:
receiving an initial set of first, second and third fingerprint image strips;
determining whether two of the initial set of fingerprint image strips overlap another of the initial set of fingerprint image strips; and
if so, using the initial set of fingerprint image strips as the first, second and third fingerprint image strips; and
if not, receiving further fingerprint image portions until two of the fingerprint image strips overlap another of the fingerprint image strips, and using those fingerprint image strips as the first, second and third fingerprint image strips.

4. A method as claimed in claim 1, wherein each of the fingerprint image strips has a width of less than 10 mm.

5. A method as claimed in claim 1, wherein the predetermined minimum width for the larger portion is at least 12 mm or at least twice a width of the fingerprint image strips.

6. A method as claimed in claim 1, wherein each of the fingerprint image strips has the width and a length, the width being narrower than the length and the lengths of each of the fingerprint image strips being substantially parallel to one another.

7. A method as claimed in claim 6, wherein the lengths of each of the fingerprint image strips is substantially parallel to a longitudinal direction of the finger.

8. A method as claimed in claim 1, wherein when the width of the larger portion of the fingerprint is not greater than a predetermined minimum width, the method comprises requesting input of further fingerprint image strips.

9. A method as claimed in claim 1, further comprising:
alerting a user when additional fingerprint image strips are required to complete enrolment including when the width of the enrolled portion of the fingerprint is not greater than the predetermined minimum width and/or when three overlapping fingerprint image strips have not been provided.

10. An electronic card comprising a swipe-type fingerprint sensor having a rectangular scan area where a width of a longer side thereof is less than 10 mm for obtaining first, second, and third fingerprint image strips, and a processor for enrolment of a fingerprint, the electronic card being arranged to:
receive data representing the first fingerprint image strip, the second fingerprint image strip and the third fingerprint image strip, each fingerprint image strip representing a portion of the fingerprint and the second and third fingerprint image strips overlapping the first fingerprint image strip;
extract minutiae from each of the first, second and third fingerprint image strips;
match the extracted minutiae of the first, second and third fingerprint image strips to determine relative positions of the fingerprint image strips;
combine the minutiae of the first, second and third fingerprint image strips based on their relative positions to produce a combined set of minutiae representing a larger portion of the fingerprint; and
determine that the fingerprint has been successfully enrolled if a width of the larger portion of the fingerprint is greater than a predetermined minimum width;

wherein the processor is arranged such that matching the extracted minutiae of at least two of the first, second and third fingerprint image strips comprises:

determining a first local neighbourhood for each extracted minutiae of one of the fingerprint image strips and for each extracted minutiae of another of the fingerprint image strips, wherein each first local neighbourhood includes at least one extracted minutia neighbouring the respective extracted minutia;

comparing the first local neighbourhoods of the extracted minutiae of the one of the fingerprint image strips with the first local neighbourhoods of the extracted minutiae of the other of the fingerprint image strips to determine matched minutiae appearing in both the extracted minutiae of the one of the fingerprint image strips and the extracted minutiae of the other of the fingerprint image strips;

determining a second local neighbourhood for each unmatched extracted minutiae of the one of the fingerprint image strips and in the other of the fingerprint image strips, wherein each extracted minutia that is not a matched minutia is an unmatched extracted minutia, and wherein each second local neighbourhood includes at least one matched minutia neighbouring the respective unmatched extracted minutia;

comparing the second local neighbourhoods of the unmatched extracted minutiae of the one of the fingerprint image strips with the second local neighbourhoods of the unmatched extracted minutiae of the other of the fingerprint image strips to determine further matched minutiae appearing in both the extracted minutiae of the one of the fingerprint image strips and the extracted minutiae of the other of the fingerprint image strips, wherein the relative position of fingerprint image strips is determined also based on the further matched minutia.

11. A non-transitory computer program product encoded with computer instructions comprising instructions that when executed will cause a processor to perform a method according to claim 1.

12. A method as claimed in claim 1, wherein each of the fingerprint image strips has a width of less than 7 mm.

13. A method according to claim 1, further comprising, after determining the matched minutiae and before determining the further matched minutiae, filtering the matched minutiae based on the position and/or orientation of each of the matched minutiae within the first and second sets of minutiae, wherein filtering the matched minutiae comprises:

determining a relative position and/or a relative orientation of each matched minutia between the first and second sets of minutiae; and filtering out matched minutiae having a relative position and/or a relative orientation that is outside of an allowable region, wherein the allowable region has a predetermined range and is positioned so as to maximise the number of matched minutiae within the range.

14. The electronic card as claimed in claim 10, wherein the electronic card comprising a memory and a processor.

15. The electronic card as claimed in claim 10, wherein the fingerprint sensor has a width of less than 7 mm.

16. The electronic card according to claim 10, wherein the processor is arranged to, after determining the matched minutiae and before determining the further matched minutiae, filter the matched minutiae based on the position and/or orientation of each of the matched minutiae within the first and second sets of minutiae, wherein filtering the matched minutiae comprises:

determining a relative position and/or a relative orientation of each matched minutia between the first and second sets of minutiae; and filtering out matched minutiae having a relative position and/or a relative orientation that is outside of an allowable region, wherein the allowable region has a predetermined range and is positioned so as to maximise the number of matched minutiae within the range.

\* \* \* \* \*